US011730184B2

(12) United States Patent
Hall et al.

(10) Patent No.: US 11,730,184 B2
(45) Date of Patent: Aug. 22, 2023

(54) SYSTEM AND PROCESS FOR GRINDING AND HANDLING OF DRIED ORGANIC MATERIALS

(71) Applicant: Bubbly Blaster, LLC, Los Angeles, CA (US)

(72) Inventors: Bradley Hall, Hollywood, CA (US); Stason Strong, Playa del Rey, CA (US)

(73) Assignee: BUBBLY BLASTER, LLC, Los Angeles, CA (US)

( * ) Notice: Subject to any disclaimer, the term of this patent is extended or adjusted under 35 U.S.C. 154(b) by 228 days.

(21) Appl. No.: 17/333,441

(22) Filed: May 28, 2021

(65) Prior Publication Data
US 2022/0378085 A1  Dec. 1, 2022

(51) Int. Cl.
 A24B 7/06 (2006.01)
 A47J 42/14 (2006.01)

(52) U.S. Cl.
 CPC ............. *A24B 7/06* (2013.01); *A47J 42/14* (2013.01)

(58) Field of Classification Search
 CPC . A47J 42/12; A47J 42/14; A47J 42/42; A24B 7/06
 See application file for complete search history.

(56) References Cited

U.S. PATENT DOCUMENTS

| 9,757,733 | B1 * | 9/2017 | Dukat | A47J 42/40 |
| | | | | 241/68 |
| 11,497,352 | B1 * | 11/2022 | Acar | A47J 42/30 |
| | | | | 241/68 |
| 2008/0191073 | A1 * | 8/2008 | Bao | B02C 18/24 |
| | | | | 241/101.2 |
| 2012/0168544 | A1 * | 7/2012 | Chaoui | A47J 42/24 |
| | | | | 241/68 |
| 2013/0214068 | A1 * | 8/2013 | Camitta | B02C 18/2216 |
| | | | | 241/83 |
| 2016/0100715 | A1 | 8/2016 | Staiano | |
| 2018/0206675 | A1 | 7/2018 | Mennillo | |

(Continued)

OTHER PUBLICATIONS

Kim, International Search Report and Written Opinion of the International Searching Authority, dated Jun. 14, 2022, entered in related PCT patent application No. PCT/US2022/020823.

*Primary Examiner* — Debra M Sullivan
*Assistant Examiner* — Matthew Stephens
(74) *Attorney, Agent, or Firm* — Cislo & Thomas, LLP

(57) ABSTRACT

A system and method for processing organic material, the system having four stackable housings, each housing defining a compartment, in which a first compartment of a first housing contains upper grinding teeth, and second compartment of a second housing contains lower grinding teeth, and when organic material is added to the second compartment, the upper grinding teeth and the lower grinding teeth work together to crush the organic material into smaller pieces and granules. The second housing contains holes to allow the smaller pieces and granules to fall into a third compartment of a third housing, where a filter catches the smaller pieces but allows the granules to fall to a fourth compartment of a fourth housing. The third housing has Smaller pieces trapped by the filter can be removed a sidewall opening in the third housing, and the granules can be removed through a slot in the fourth housing.

20 Claims, 24 Drawing Sheets

(56) References Cited

U.S. PATENT DOCUMENTS

| | | | |
|---|---|---|---|
| 2018/0126386 A1* | 10/2018 | Witko | B02C 18/08 241/68 |
| 2019/0269278 A1* | 9/2019 | Neury | A47J 42/34 241/68 |
| 2021/0127901 A1* | 5/2021 | Krasnopolskiy | A24C 5/42 241/68 |

* cited by examiner

SYSTEM AND PROCESS FOR GRINDING AND HANDLING OF DRIED ORGANIC MATERIALS

TECHNICAL FIELD

This invention relates to methods and devices for processing organic material, such as plants, herbs, spices, and the like.

BACKGROUND

Traditional grinders and other devices for processing organic material are made of numerous different components that have to work together precisely. Due to the multiple components there are many points where traditional grinders can fail or malfunction. In addition, there are a lot of frustration in having to carefully unscrew traditional grinders, and fumble with tiny scooping and cleaning tools, ultimately losing valuable product one pinch at a time.

Therefore, there is a need for an organic material processing system that eliminates the tedious tasks of the traditional grinder, and provides easily controlled and hassle-free organic material grinding, sorting and conveyance system, so that the user does not have to fumble with small parts and cleaning tools, and lose flower.

SUMMARY

The present invention is directed towards a system designed to simplify the process of grinding dried organic material (e.g., cannabis, plants, seeds, herbs, spices, and the like) by incorporating features that improve the filtering, sorting, storing and dispensing of the organic material, as well as improvements in the ease of using and cleaning the system.

The system of the present invention comprises a series of housings defining compartments stacked on top of each other through which organic material is processed, filtered and sorted, and dispensed as the organic material moves from compartment to compartment. The first two housings comprise grinding teeth that processes the organic material by cut, shred, crush, and/or grind the organic material between the grinding teeth. Residual material stuck on the grinding teeth can be easily removed using plates defining holes that receive the grinding teeth to scrape the residual material off the grinding teeth as the plate moves up and down along the grinding teeth. A revolving door concept integrated into the second and third housing is used to open and close the system to allow the processed product to be conveyed without disassembling the system. The fourth housing catches granular material and can deliver a controlled amount of kief, for example, using uniquely design dispensing fins projecting into the fourth compartment from the third housing. With a single quarter turn of the third compartment, a slot in the fourth housing is temporarily opened creating a small passage for the dispensing fins to deliver an ideal amount ground material from the fourth compartment before securely closing the passage. For more kief, the third compartment simply needs to be rotated again.

The system of the present invention can be constructed from top quality, food-safe materials, and uses strong stainless-steel magnets to adhere its compartments and plates in their respective positions, making for a simple snapping experience when opening and closing.

DETAILED DESCRIPTION OF THE INVENTION

Figure 1:
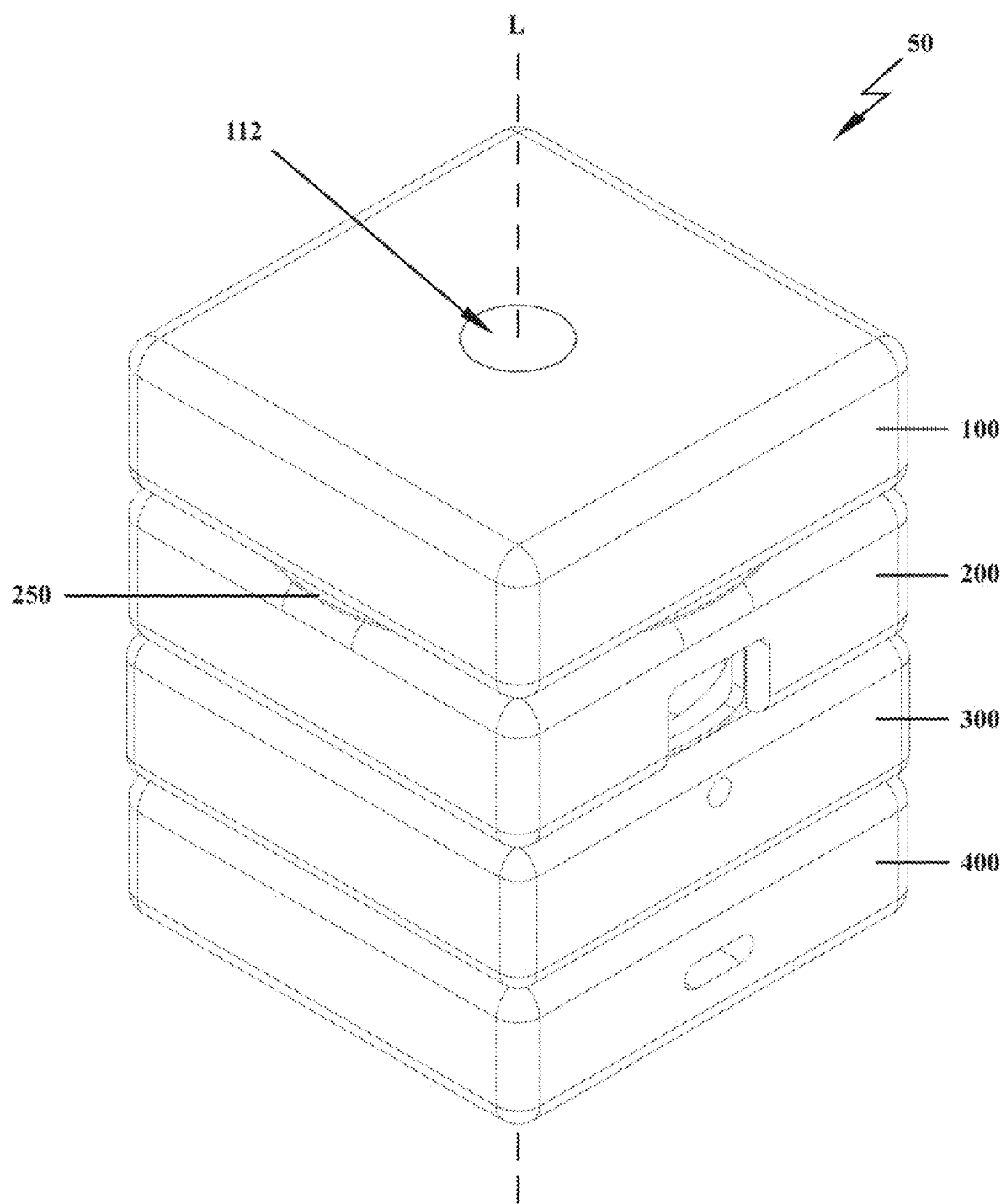
FIG. 1 shows a perspective view of an embodiment of the present invention fully assembled.
Figure 2:
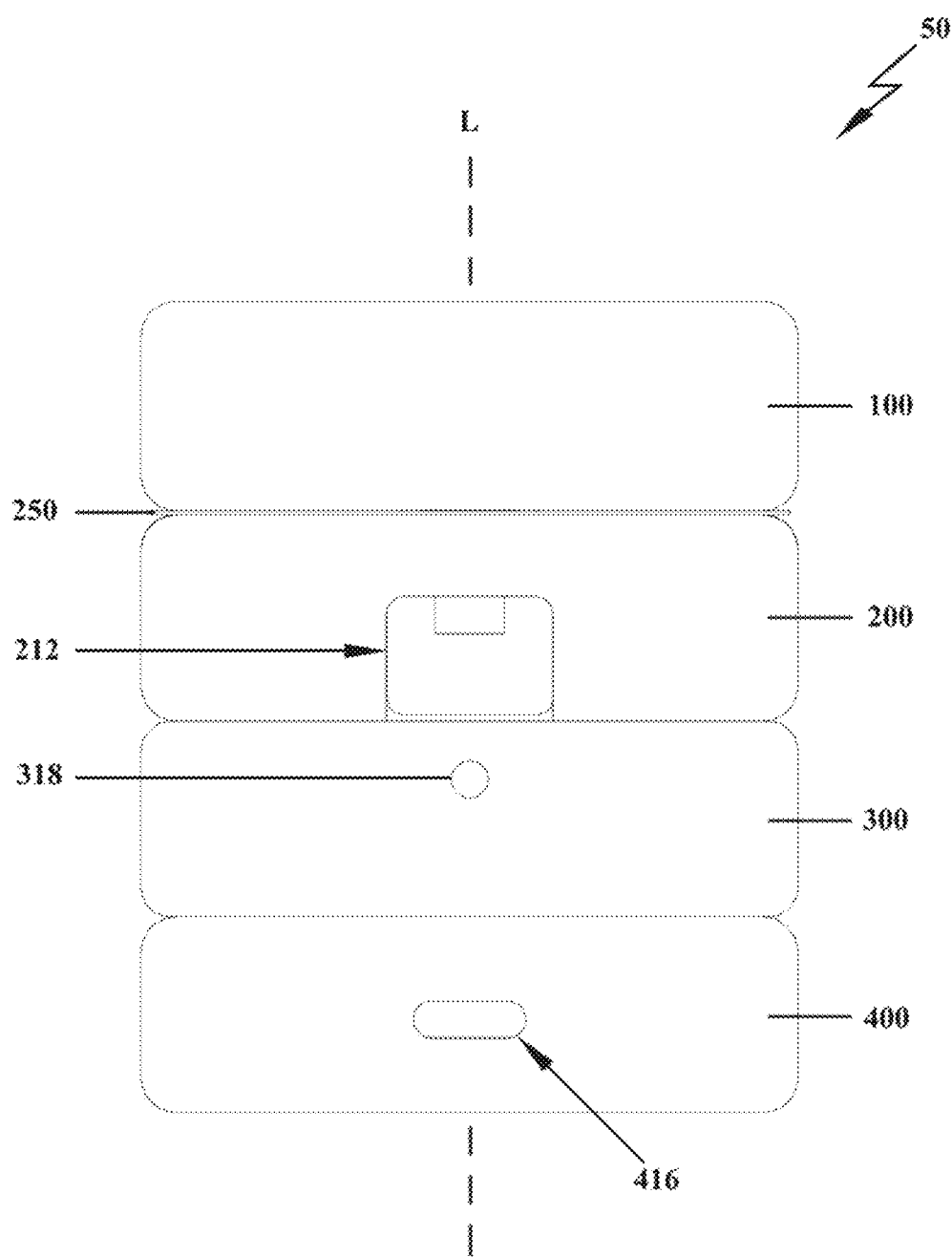
FIG. 2 shows an elevation view of the embodiment shown in FIG. 1.
Figure 3:
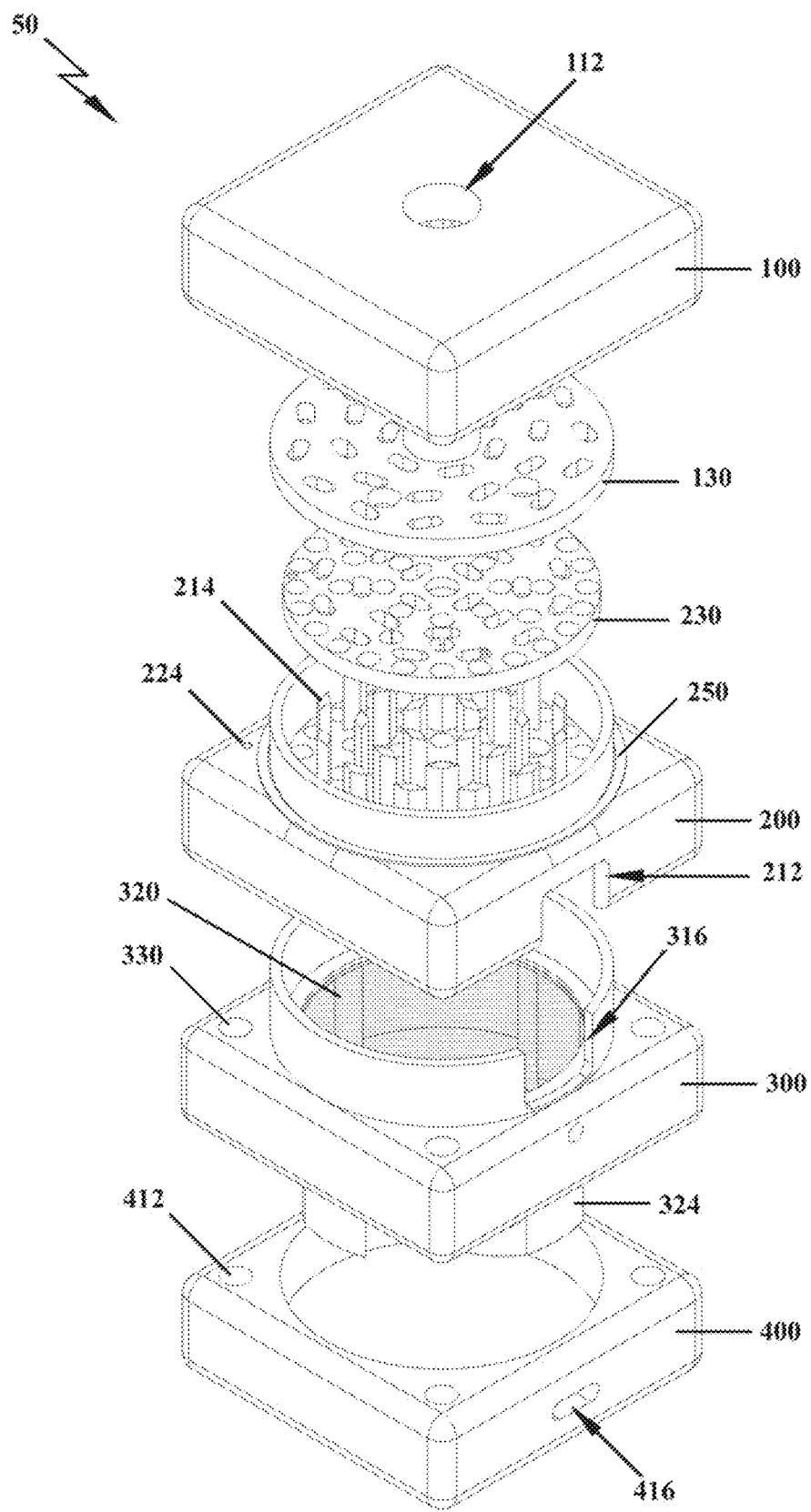
FIG. 3 shows an exploded view of the embodiment shown in FIG. 1 from the top.
Figure 4:
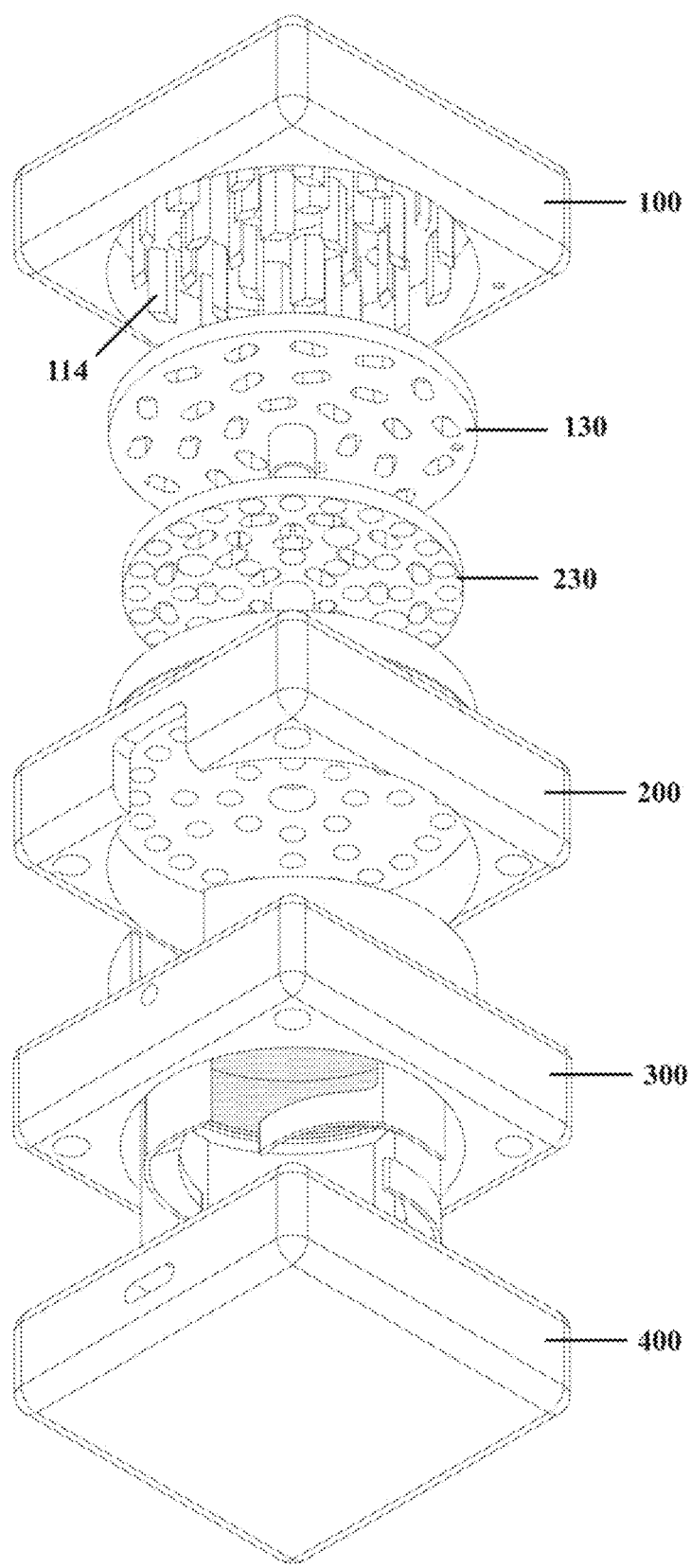
FIG. 4 shows an exploded view of the embodiment shown in FIG. 1 from the bottom.
Figure 5:
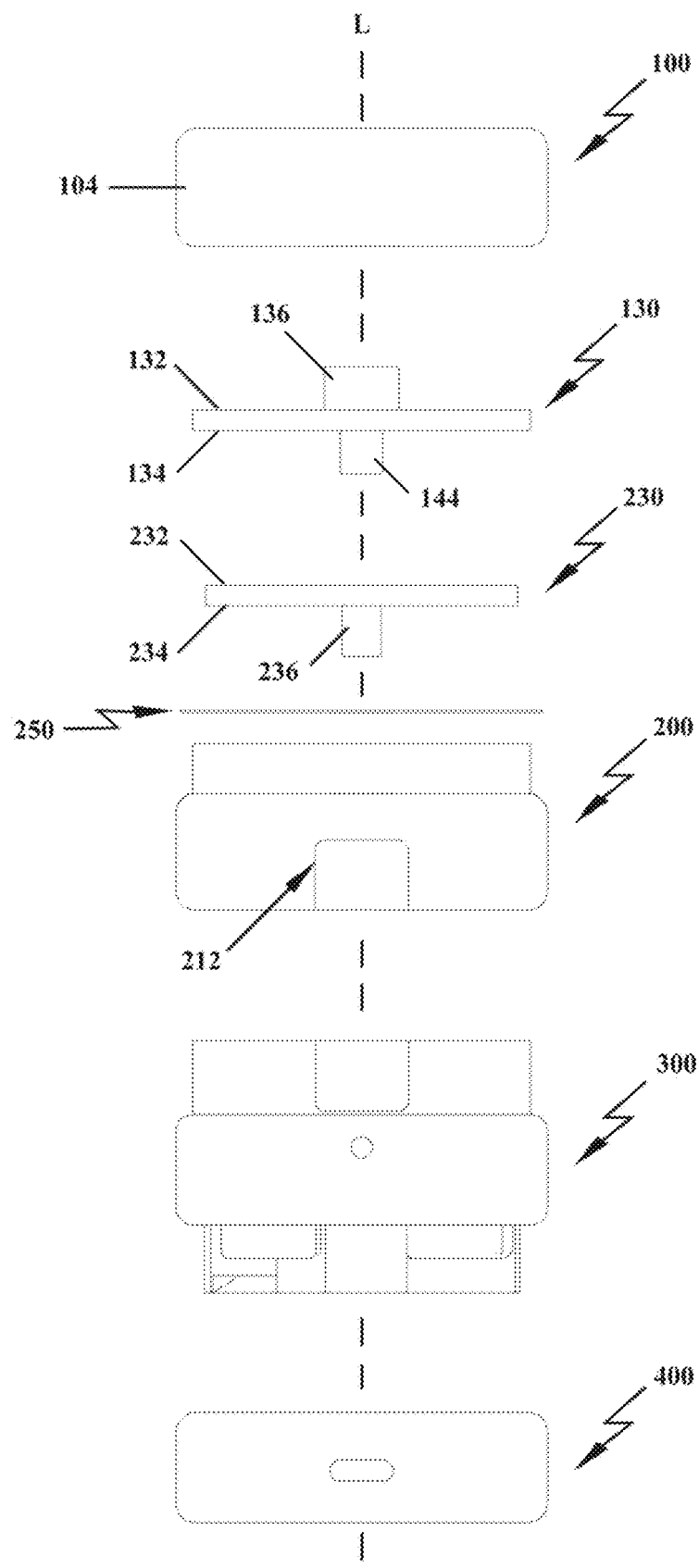
FIG. 5 shows an exploded view of the embodiment shown in FIG. 1 from the side.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

With reference to the FIGS. 1-5, the invention of the present application is a system 50 for processing organic material, comprising a plurality of housings 100, 200, 300, 400, each housing defining a compartment 106, 206, 306, 406, wherein the housings are configured to fit together and function such that organic material can be added to one compartment, processed, and passed to the next compartment, where partially processed material can be separated from fully processed granulated material by a filter 320 so that the partially processed material and the fully processed granulated material can be collected separately. In the preferred embodiment, there are four housings 100, 200, 300, 400 stacked on top of each other defining a longitudinal axis L through the centers of each housing, and the grinding action and passing of the organic material from one compartment to the next compartment is achieved by rotating the housings relative to each other. For example, rotation of a first housing 100 relative to a second housing 200 causes upper grinding teeth 114 projecting from the first housing 100 to pass closely by lower grinding teeth 214 projecting from the second housing 200, such that organic material caught between the upper grinding teeth 114 and lower grinding teeth 214 is cut, shred, crushed, and ground. Material stuck on the upper grinding teeth 114 can be removed by the scraping action of an upper plate 130, and material stuck on the lower grinding teeth 214 can be removed by the scraping action of the lower plate 230.

Figure 6:
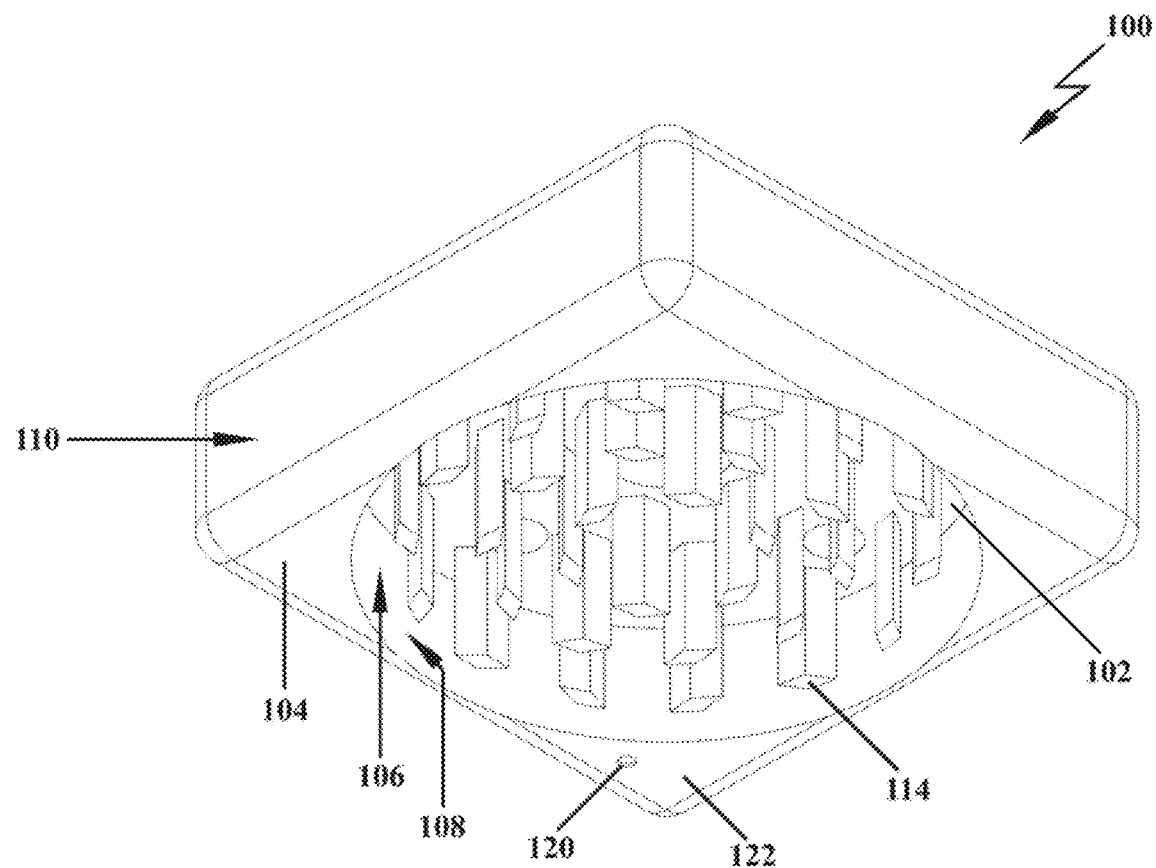
FIG. 6 shows a bottom perspective view of an embodiment of the first housing.
Figure 7:
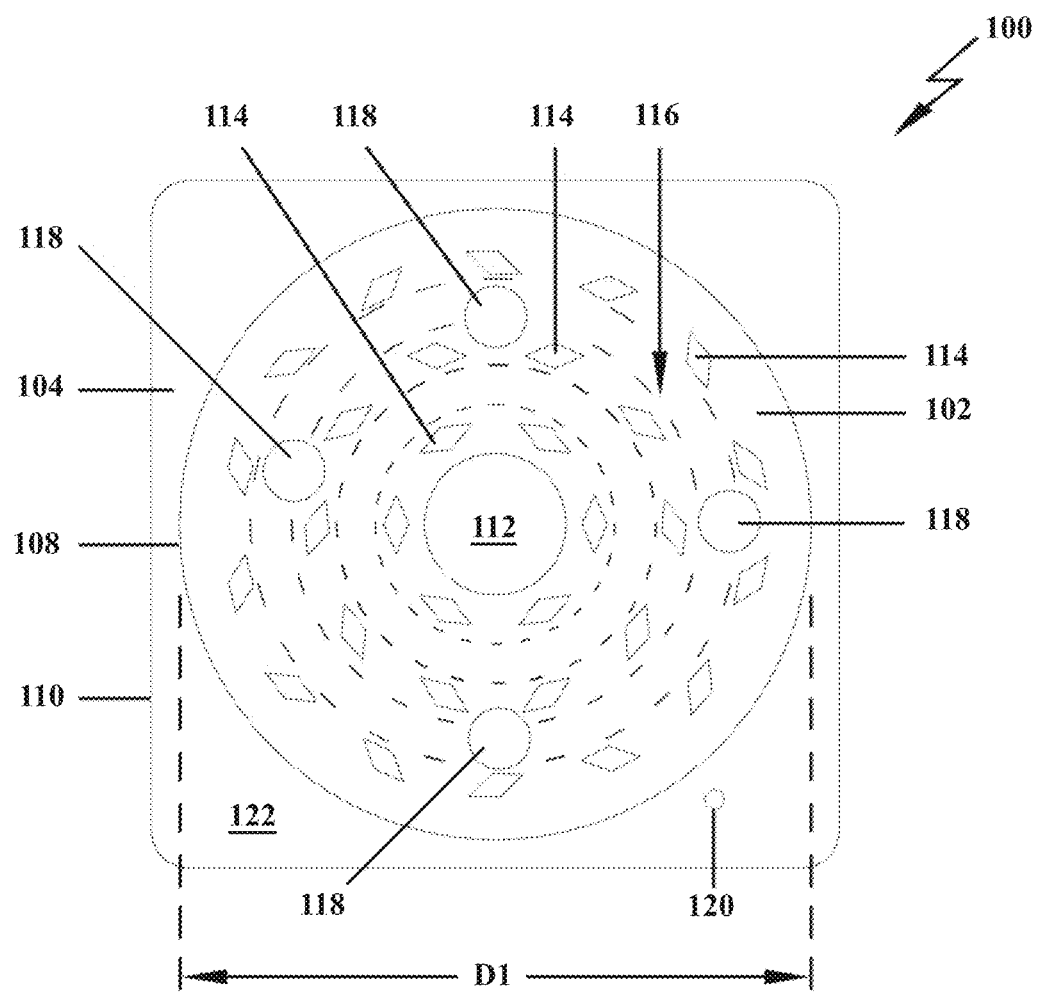
FIG. 7 shows a bottom view of an embodiment of the first housing.

With reference to FIGS. 6-7, a first housing 100 comprises a ceiling 102, a first housing sidewall 104 projecting perpendicularly from the ceiling 102, the ceiling 102 and the first housing sidewall 104 defining a first compartment 106. When the system 50 is placed in its proper orientation for use, this first housing 100 is the top or uppermost housing.

The ceiling 102 is substantially flat. The first housing sidewall 104 is defined by an inner wall 108 and an outer wall 110. The inner wall 108 of the first housing sidewall 104 defines the first compartment 106. Preferably, the inner wall 108 of the first housing sidewall 104 is cylindrical in shape having a first diameter D1. The outer wall 110 of the first housing sidewall 104 can be any shape, such as circular, triangular, rectangular, pentagonal, hexagonal, and the like. In the preferred embodiment, the outer wall 110 is rectangular, and more specifically, square shape.

The ceiling 102 of the first housing 100 defines an upper button hole 112. Preferably, the upper button hole 112 is circular in shape, but can be any other shape. The upper button hole 112 is a through-hole passing through the entire thickness of the ceiling 102. Preferably, the upper button hole 112 is located centrally on the ceiling 102. As such, the button hole 112 is aligned with the longitudinal axis L. For purposes of this application, the term "button" is intended to have a broad meaning that includes any projection configured to be pushed.

Projecting perpendicularly from the ceiling 102 into the first compartment 106 are a plurality of upper grinding teeth 114. As such, the upper grinding teeth 114 reside in the first compartment 106. The upper grinding teeth 114 generally surround the upper button hole 112. Preferably, the plurality of upper grinding teeth 114 are arranged in sets of concentrically arranged rings about the upper button hole 112, such that a uniform, ring-shaped gap 116 exists in between each set of upper grinding teeth rings as depicted using broken lines shown in FIG. 7. The plurality of upper grinding teeth 114 can also be arranged as a set of uniformly spaced apart rows (and/or columns).

The upper grinding teeth 114 are elongated, stiff posts. The upper grinding teeth 114 can be any shape, such as cylindrical, triangular, rectangular, parallelogram, and the like. Preferably, the upper grinding teeth are diamond shaped (or rhombus), thereby creating sharp corners and flat surfaces.

A plurality of upper plate magnets 118 can be placed on the ceiling 102 of the first housing 100. Preferably, the upper plate magnets 118 are flush with the ceiling 102, and therefore, do not project into the first compartment 106 like the upper grinding teeth 114. The upper plate magnets 118 can be interspersed in between the upper grinding teeth 114. Preferably, there are four upper plate magnets 118. The upper plate magnets 118 can be separated approximately 90 degrees radially from each other about the upper button hole 112.

To facilitate assembly of the device 10, the first housing 100 can have a first housing alignment marker 120. Preferably, the first housing alignment marker 120 is placed on the first housing sidewall 104, such as the inner wall 108, the outer wall 110, the bottom surface 122 of the first housing sidewall 104, or any combination thereof. The first housing alignment marker 120 can also be placed on the ceiling 102. Any alignment marker discussed herein can be of any form that is easily perceived by the user. For example, any of the alignment markers can be a marking, a projection, a recess, or the like, or any combination thereof.

Figure 8:
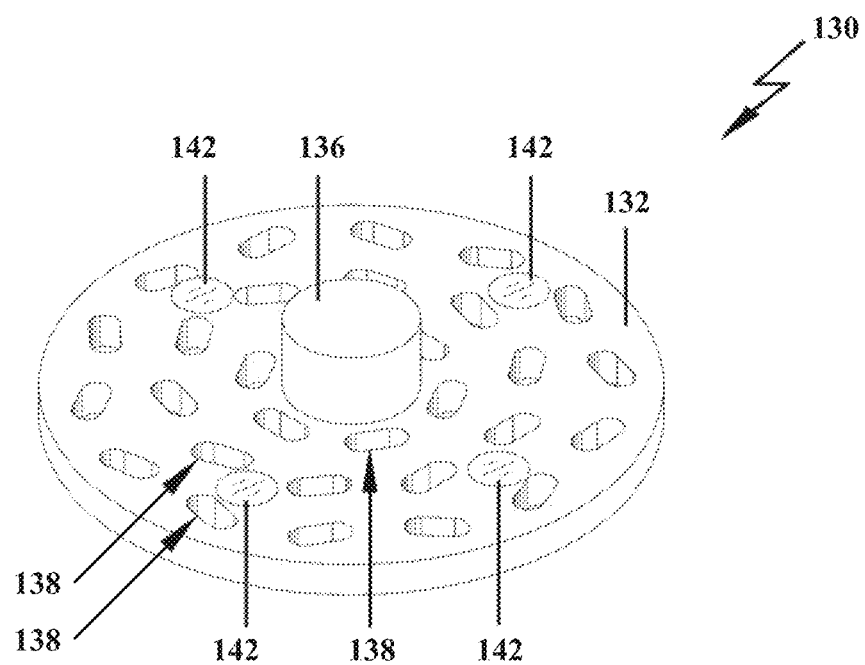
FIG. 8 shows a top perspective view of an embodiment of the upper plate.
Figure 9:
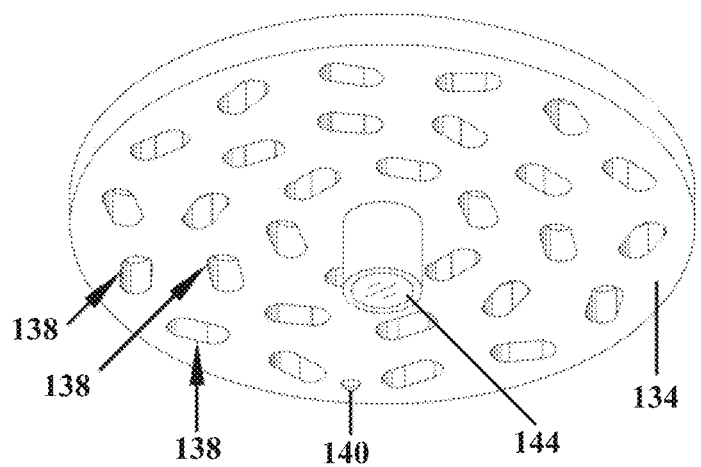
FIG. 9 shows a bottom perspective view of the upper plate.
Figure 10:
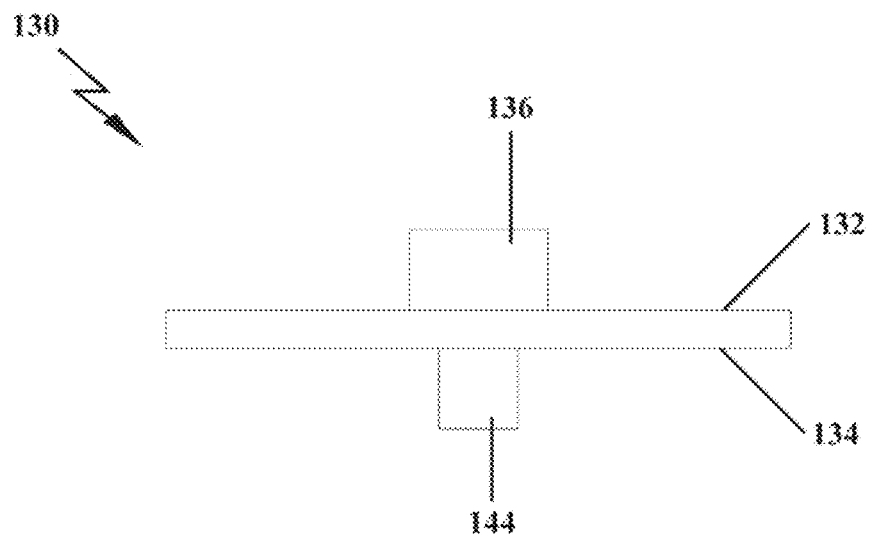
FIG. 10 shows a side view of the upper plate.

With reference to FIGS. 8-10, the system 50 further comprises an upper plate 130 configured to reside in the first compartment 106. As such, the shape of the upper plate 130 can be substantially similar to the shape of the first compartment 106. The shape of the upper plate 130 can be any shape as long as it fits inside the first compartment 106. Preferably, the upper plate 130 is circular to match the first compartment 106. The upper plate 130 is defined by a top side 132 and a bottom side 134 opposite the top side 132. An upper plate button 136 can protrude perpendicularly from the top side 132 of the upper plate 130. The upper plate button 136 is configured to be inserted into the upper button hole 112 of the first housing 100. As such, the upper plate button 136 can be centrally located on the upper plate 130 so as to align with the longitudinal axis L when the upper plate 130 is placed inside the first compartment 106. In addition, the upper plate button 136 can be substantially the same shape as the upper button hole 112.

The upper plate 130 further defines a plurality of upper grinding teeth holes 138. The plurality of upper grinding teeth holes 138 are configured to receive the plurality of upper grinding teeth 114. As such, the number, orientation, and arrangement of the upper grinding teeth holes 138 are sufficient to allow each upper grinding tooth 114 to pass through one of the upper grinding teeth holes 138. In the preferred embodiment, the upper grinding teeth holes 138 arranged as sets of concentric rings about the upper plate button 136 that match the concentric ring formation of the upper grinding teeth 114.

The upper grinding teeth holes 138 can be any shape sufficient to allow the upper grinding teeth 114 to pass through. In some embodiments, the upper grinding teeth holes 138 can be the same shape as the upper grinding teeth 114. Preferably, the upper grinding teeth 114 pass narrowly through the upper grinding teeth holes 138, such that residual organic material left on the upper grinding teeth 114 after the grinding process can be knocked off by the upper plate 130 moving up and down along upper grinding teeth 114 (as will be described in more detail below).

To facilitate proper alignment of the upper plate 130 with the first housing 100 so that the upper grinding teeth 114 of the first housing 100 align with the upper grinding teeth holes 138 of the upper plate 130, the upper plate 130 can comprise an upper plate alignment marker 140. Preferably, the upper plate alignment marker 140 is placed on the bottom side 134 of the upper plate 130 near the perimeter edge; however, the upper plate alignment marker 140 can be placed anywhere on the upper plate 130 that will facilitate proper alignment of the upper plate 130 to the first housing 100. The upper plate alignment marker 140 can be any shape, but preferably, it matches the first housing alignment marker 120. The upper plate alignment marker 140 and the first housing alignment marker 120 are positioned on the upper plate 130 and the first housing 100, respectively, in a manner such that when the upper plate alignment marker 140 is aligned with the first housing alignment marker 120, each upper grinding tooth 114 aligns with one of the upper grinding teeth holes 138 so that the upper plate 130 can lay flat against the ceiling 102 of the first housing 100. Although the use of alignment markers is the preferred method for quickly aligning the upper plate 130 with the first housing 100, other methods can be used. For example, one of the upper grinding teeth 114 (or a separate post that does not have a grinding function) can have a shape that is distinctly different from the other upper grinding teeth 114. One of the upper grinding teeth holes 138 can similarly have a shape that matches the separate post. These distinctly shaped post and matching hole can be arranged such that when the two are aligned, all other upper grinding teeth 114 are aligned with one of the upper grinding teeth holes 138. Similarly, projections and complementary notches can be formed on the upper plate 130 and the first housing sidewall 104, such that the upper plate 130 can only fit into the first compartment 106 in one orientation, which allows each of the upper grinding teeth 114 to align with one of the upper grinding teeth holes 138.

To removably attach the upper plate 130 to the ceiling 102 of the first housing 100, the upper plate 130 can have a plurality of reciprocal upper plate magnets 142 on the top side 132 of the upper plate 130. The plurality of reciprocal upper plate magnets 142 correspond with the upper plate magnets 118 when the upper plate button 136 is inserted into the upper button hole 112 and the plurality of upper grinding teeth 114 are inserted through the plurality of upper grinding teeth holes 138. This configuration allows the upper plate 130 to be removed or detached from the ceiling 102 by holding the first housing 100 securely and pushing the upper plate button 136 out of the upper button hole 112. The upper plate 130 is reattached to the ceiling 102 when force upon the upper plate button 136 is removed. Repeating this action causes the upper plate to scrape the residue off of the upper grinding teeth 114. The user of the term "magnet" in this application is intended to be interpreted broadly and includes magnetic or magnetized material.

The upper plate 130 can also have an upper plate center magnet 144 centrally located on the upper plate 130 and projecting perpendicularly from the bottom side 134 of the upper plate 130 opposite the upper plate button 136 and configured to be in line with the longitudinal axis L when the upper plate 130 is properly installed in the first housing 100.

Figure 11:
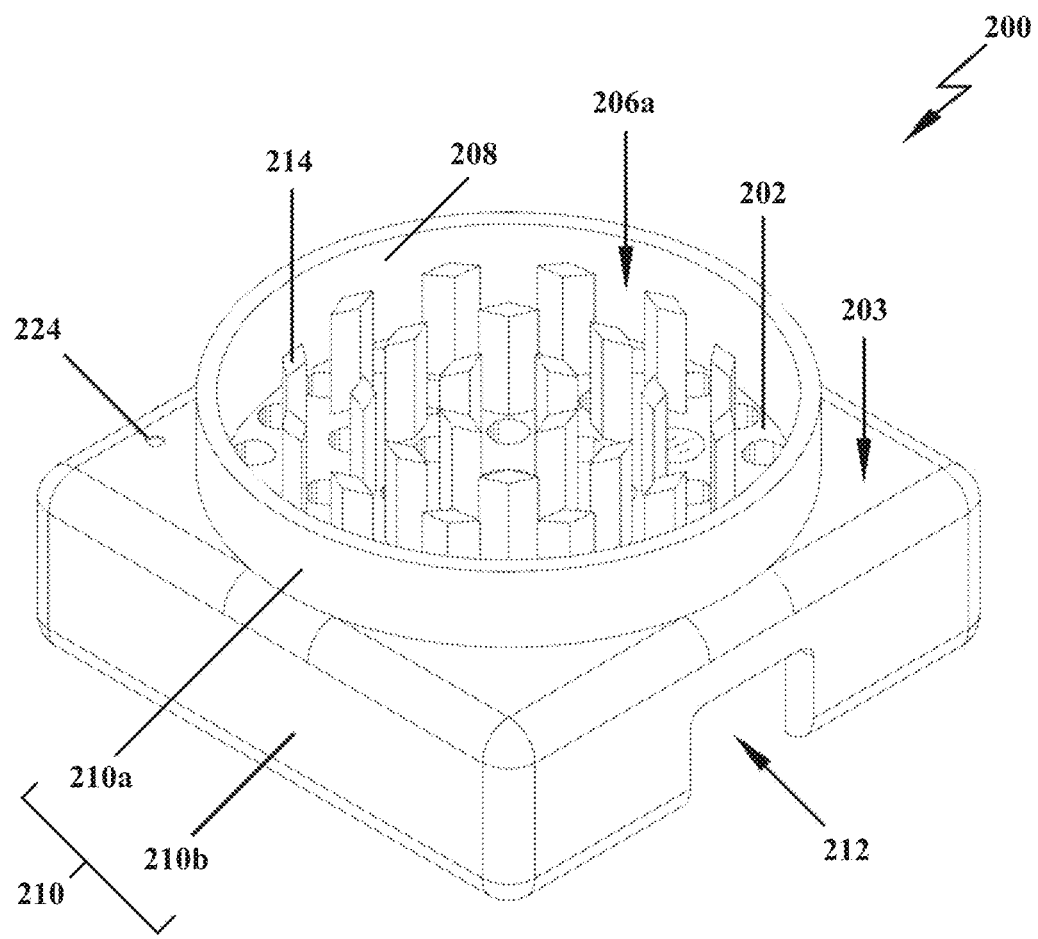
FIG. 11 shows a top perspective view of an embodiment of the second housing.
Figure 12:
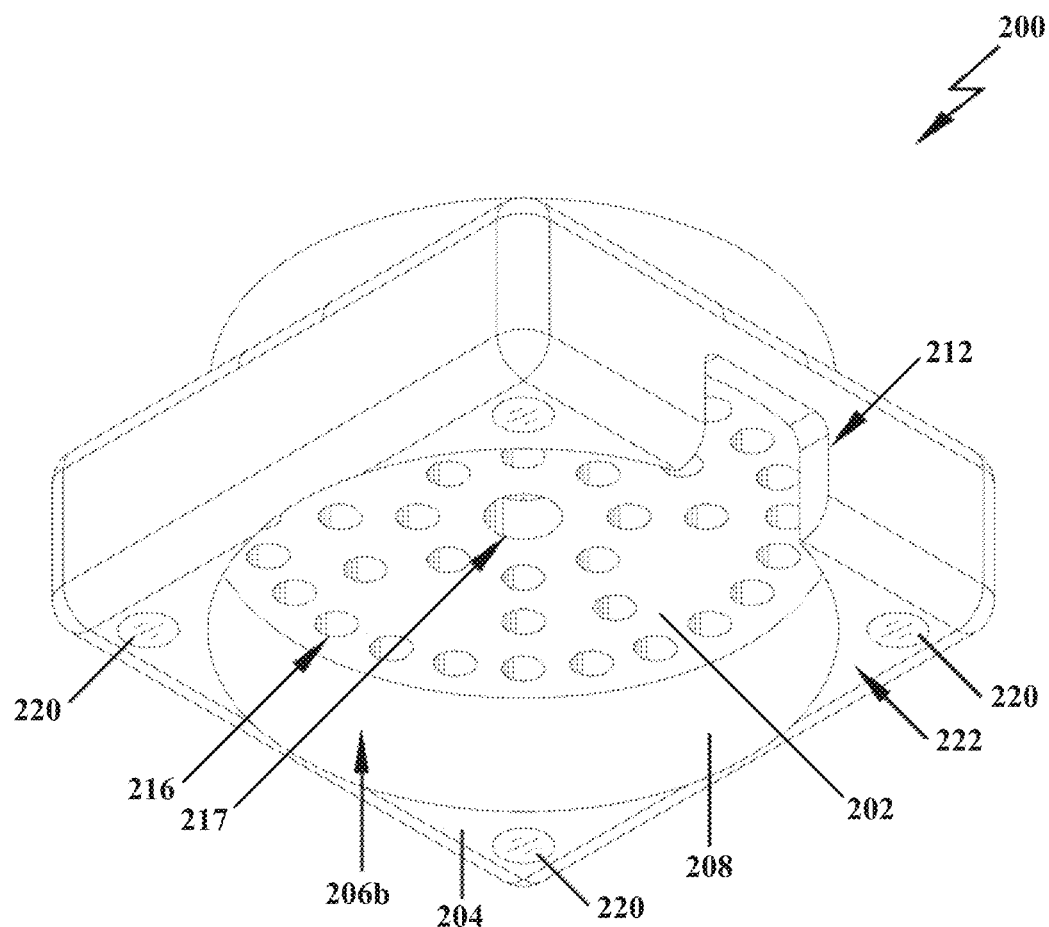
FIG. 12 shows a bottom perspective view of the second housing.
Figure 13:
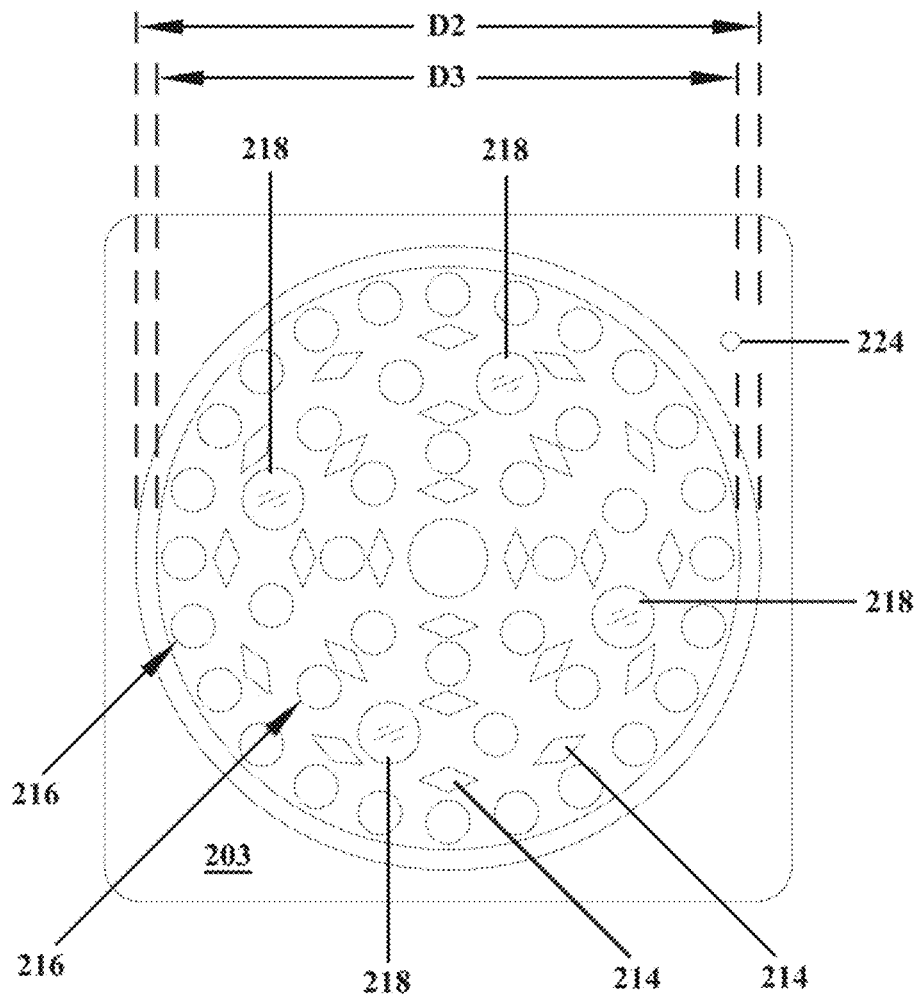
FIG. 13 shows a top view of the second housing.

With reference to FIGS. 11-13, a second housing 200 is configured to be positioned adjacent to the first housing 100. Specifically, the first housing 100 is configured to mount on top of the second housing 200. The second housing 200 comprises a second housing sidewall 204 defining a second compartment. The second housing sidewall 204 is defined by an inner wall 208 and an outer wall 210. The inner wall 208 is preferably cylindrical in shape.

The second housing 200 further comprises a base 202 operatively connected to the inner wall 208 effectively dividing the second compartment 206 into an upper compartment 206a and a lower compartment 206b. The upper outer wall 210a of the second housing sidewall 204 corresponding with (or adjacent to) the upper compartment 206a (i.e. the portion of the second housing sidewall 204 extending upwardly from the base 202) can be cylindrical and configured to fit inside the first compartment 106 of the first housing 100.

The lower outer wall 210b of the second housing 200 corresponding with (or adjacent to) the lower compartment 206b can be any shape (i.e. the portion of the second housing sidewall 204 extending downwardly below the base 202). Preferably, the lower outer wall 210b of the second housing 200 corresponding with the lower compartment 206b is the same shape as the outer wall 110 of the first housing 100. In the preferred embodiment, the outer wall 110 of the first housing is square shape. As such, the lower outer wall 210b of the second housing 200 below the base 202 is also square shape having four sides, whereas the upper outer wall 210a above the base 202 is cylindrical. Therefore, the second housing 200 has a lower portion that is box-shaped and an upper portion that is cylindrically shaped extending upwardly from the lower portion of the second housing 200. The upper outer wall 210a of the second housing 200 has a diameter D2 that is substantially similar to the diameter D1 of the inner wall 108 of the first housing 100 such that the upper outer wall 210a of the second housing 200 can fit inside the first compartment 106. As such, the first compartment 106 of the first housing 100 and the upper compartment 206a of the second housing 200 become substantially coextensive in use. In this configuration, the bottom surface 122 of the first housing sidewall 104 can rest on top of (i.e. be mounted on top of) the base 202 of the second housing 200 outside of the upper outer wall 210a.

The second housing sidewall 204 can have an upper sidewall opening 212 defined in the second housing sidewall 204 adjacent to the lower compartment 206b. In other words, the upper sidewall opening 212 is through a portion of one of the sides of the lower outer wall 210b.

The second housing 200 further comprises a plurality of lower grinding teeth 214 projecting into the upper compartment 206a from the base 202. The plurality of lower grinding teeth 214 can be arranged in a manner that is complementary to the upper grinding teeth 114 of the first housing 100, such that when the first housing 100 is mounted on top of the second housing 200, the lower grinding teeth 214 are positioned in between the upper grinding teeth 114. For example, in the preferred embodiment, the upper grinding teeth 114 are arranged as sets of concentric rings with circular, ring-shaped gaps 116 in between each set of concentrically arranged upper grinding teeth 114. In the preferred embodiment, the lower grinding teeth 214 are also arranged as sets of concentric rings with each set of concentric rings of the lower grinding teeth 214 residing in one of the ring-shaped gaps 116 defined by the concentrically arranged upper grinding teeth 114. As such, the plurality of lower grinding teeth 214 are configured to pass by the plurality of upper grinding teeth 114 when the first housing 100 is rotated relative to the second housing 200. The lower grinding teeth 214 should pass by sufficiently close to the upper grinding teeth 114 such that organic material caught in between the lower grinding teeth 214 and upper grinding teeth 114 are partially processed by being cut or shredded as the lower grinding teeth 214 and upper grinding teeth 114 pass by each other. Repeated rotation of the first housing 100 relative to the second housing 200 results in some of the organic material becoming fully processed into granules or powder.

The second housing 200 can further comprise a plurality of drop-through holes 216 defined within the base 202 and interspersed in between the plurality of lower grinding teeth 214. Each drop-through holes 216 passes completely through the thickness of the base 202. The drop-through holes 216 are small enough to reside within the gaps in between the lower grinding teeth 214, but large enough to allow partially processed (i.e. un-granulated, but cut or shredded organic material) to fall through. Therefore, in general, whole organic material placed in the upper compartment 206a would be too large to fall through drop-through holes 216. When the first housing 100 is mounted on top of the second housing 200, and the first housing 100 is rotated relative to the second housing 200, the upper grinding teeth 114 and lower grinding teeth 214 begin cutting, shredding, crushing, and grinding the whole organic material into smaller pieces and granules. The granules fall easily through the drop-through holes into the lower compartment 206b. Pieces of the organic material that are too large to fall through the drop-through holes 216 are further crushed and shredded in between the upper grinding teeth 114 and the lower grinding teeth 214. Eventually, as the first housing 100 continues to rotate relative to the second housing, the organic material becomes small enough partially processed pieces to fall through the drop-through holes 216 into the lower compartment 206b along with the granules.

The base 202 further defines a lower button hole 217 centrally located on the base 202 and aligned with the longitudinal axis L.

The second housing 200 also comprises a plurality of magnets to secure other components of the invention to the second housing 200. For example, the second housing 200 can comprise a plurality of lower plate magnets 218 on the top side 203 of the base 202 on the upper compartment 206a side. The lower plate magnets 218 can be interspersed in between the lower grinding teeth 214 and the drop-through holes 216. Preferably, there are four lower plate magnets 218 circularly arranged about the longitudinal axis L and angularly spaced apart by about 90 degrees.

The second housing 200 can also comprise a plurality of second housing magnets 220 on the second housing sidewall 204 adjacent to the lower compartment 206b. Preferably, the plurality of second housing magnets 220 are positioned on a bottom surface 222 of the second housing sidewall 204. In the preferred embodiment in which the second housing 200 is square shaped, the second housing magnets 220 are positioned on the bottom surface 222 at the corners of the second housing 200.

To facilitate the proper assembly of the system 50, the second housing 200 can have a second housing alignment marker 224 on the second housing sidewall 204. Preferably, the second housing alignment marker 224 is on the top side 203 of the lower outer wall 210b; however, the second alignment marker 224 can be positioned anywhere on the second housing 200 where it is easily visible when viewing the upper compartment 206a, including on the base 202 within the upper compartment 206a, or on one of the sides of the lower outer wall 210b of the second housing 200, or on the upper outer wall 210a of the second housing 200.

Figure 14:
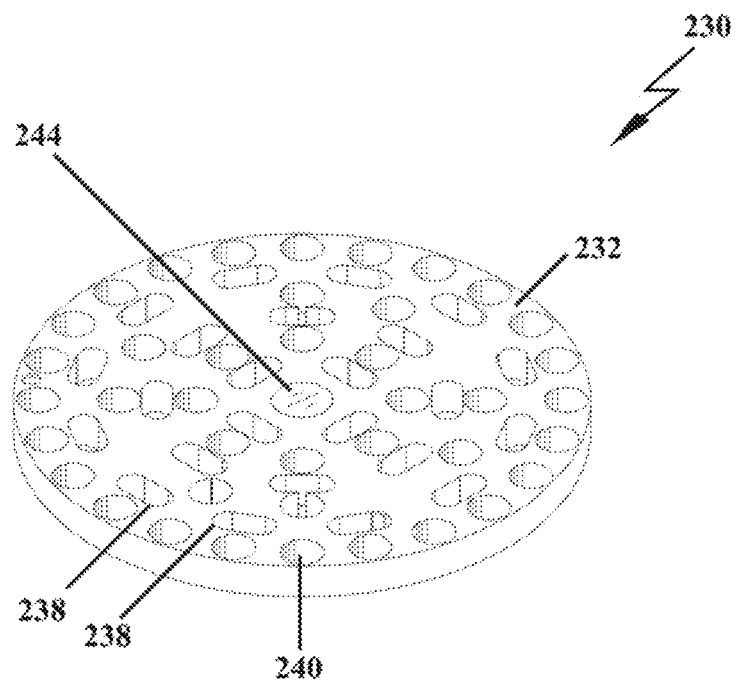
FIG. 14 shows a top perspective view of an embodiment of the lower plate.
Figure 15:
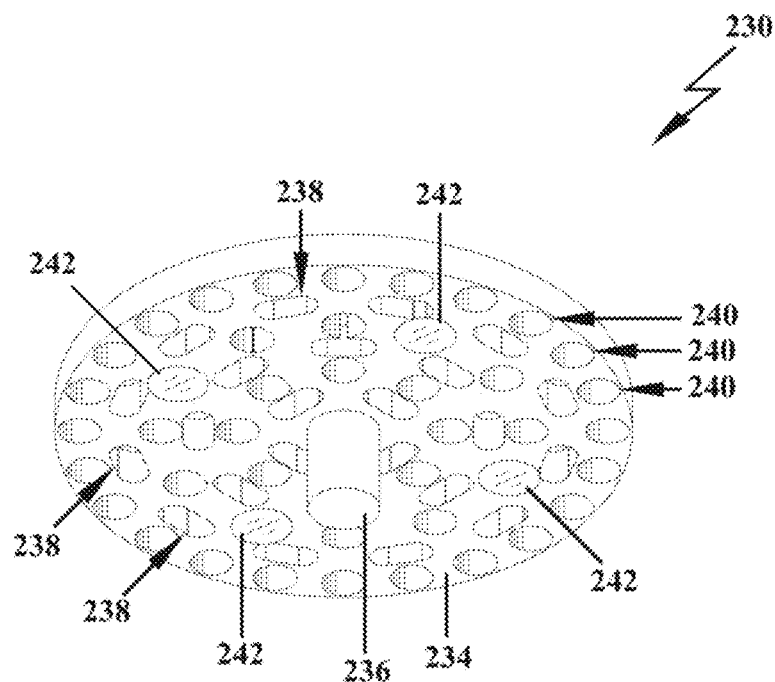
FIG. 15 shows a bottom perspective view of the lower plate.
Figure 16:
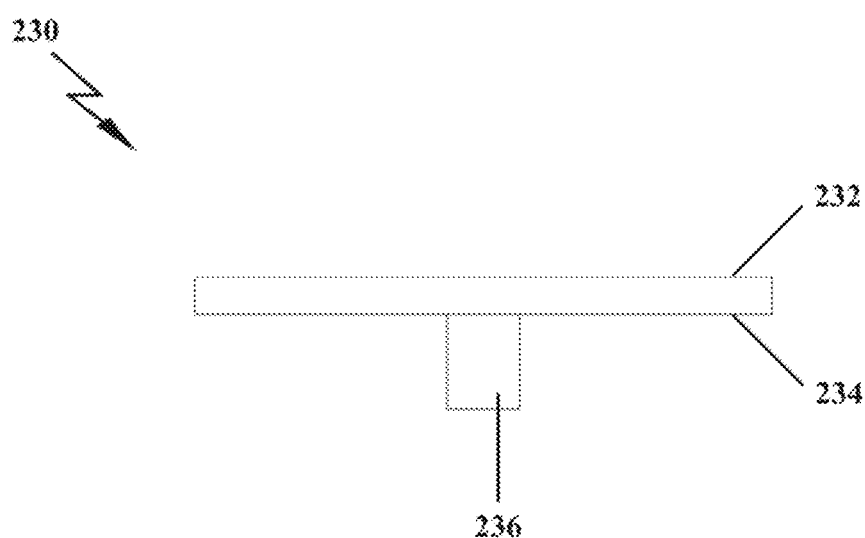
FIG. 16 shows a side view of the lower plate.

With reference to FIGS. 14-16, the system 50 further comprises a lower plate 230 configured to fit inside the upper compartment 206a of the second housing 200. As such, in the preferred embodiment, the lower plate 230 can be circular. The lower plate 230 has a top side 232 and a bottom side 234 opposite the top side 232. The bottom side 234 can have a lower plate button 236 protruding perpendicularly therefrom. The lower plate button 236 is configured to fit inside the lower button hole 217 of the second housing 200. Therefore, when the lower plate 230 is mounted inside the upper compartment 206a, the lower plate button 236 descends through the lower button hole 217.

The lower plate 232 further comprises a plurality of lower grinding teeth holes 238 configured to receive the plurality of lower grinding teeth 214. As such, the number, orientation, and arrangement of the lower grinding teeth holes 238 are sufficient to allow each lower grinding tooth 214 to pass through one of the lower grinding teeth holes 238. In the preferred embodiment, the lower grinding teeth holes 238 arranged as sets of concentric rings about the lower plate button 236 that match the concentric ring formation of the lower grinding teeth 214.

The lower grinding teeth holes 238 can be any shape sufficient to allow the lower grinding teeth 214 to pass through. In some embodiments, the lower grinding teeth holes 238 can be the same shape as the lower grinding teeth 214. Preferably, the lower grinding teeth 214 pass narrowly through the lower grinding teeth holes 238, such that residual organic material left on the lower grinding teeth 214 after processing can be knocked off by the lower plate 230 moving up and down along the lower grinding teeth 214.

The lower plate 230 can further comprise a plurality of lower plate drop-through holes 240 defined within the lower plate 230 and interspersed in between the plurality of lower grinding teeth holes 238. Each lower plate drop-through holes 240 passes completely through the thickness of the lower plate 230. The lower plate drop-through holes 240 function like the drop-through holes 216 of the second housing 200 as described above. Therefore, the lower plate drop-through holes 240 are configured such that when the lower plate 230 is properly installed in the second housing 200, the lower plate drop-through holes 240 align with the drop-through holes 216 of the second housing 200 to allow processed pieces of organic material to fall through the upper compartment 206a to the lower compartment 206b. As such, the number, spacing, configuration, shape, and orientation of the lower plate drop-through holes 240 match that of the drop-through holes 216 of the second housing 200.

The lower plate 230 can further comprise a set of magnets to facilitate assembly. The lower plate 230 can have a plurality of reciprocal lower plate magnets 242 interspersed in between the lower grinding teeth holes 238. The reciprocal lower plate magnets 242 are configured and arranged on the lower plate 230 such that when the lower plate 230 is properly installed in the second housing 200, the reciprocal lower plate magnets 242 align with and attach to the lower plate magnets 218 embedded in the base 202 of the second housing 200. Therefore, the lower plate 230 can be reversibly attached to the second housing 200.

The lower plate 230 can further comprise a lower plate center magnet 244 configured to mate with the upper plate center magnet 144 that is housed in the first housing 100. As such, the lower plate center magnet 244 is centrally located on the top side 232 of the lower plate 230. Preferably, the lower plate center magnet 244 aligns flush with the top side 232 of the lower plate 230. When the lower plate 230 is properly installed in the second housing 200 with the lower plate magnets 218 of the second housing 200 connected to the reciprocal lower plate magnets 242 of the lower plate 230, the lower plate center magnet 244 is aligned with the longitudinal axis L. When the upper plate 130 is properly installed in the first housing 100 with the upper plate magnets 118 of the first housing 100 connected to the reciprocal upper plate magnets 142 of the upper plate 130, the upper plate center magnet 144 is aligned with the longitudinal axis L and projects downwardly into the first compartment 106. The upper plate center magnet 144 is properly dimensioned such that when the first housing 100 is mounted on top of the second housing 200, the upper plate center magnet 144 attaches to the lower plate center magnet 244, allowing the first housing 100 to be connected to the second housing 200, but still allowing the first housing 100 to rotate about the longitudinal axis L relative to the second housing 200.

Figure 17:
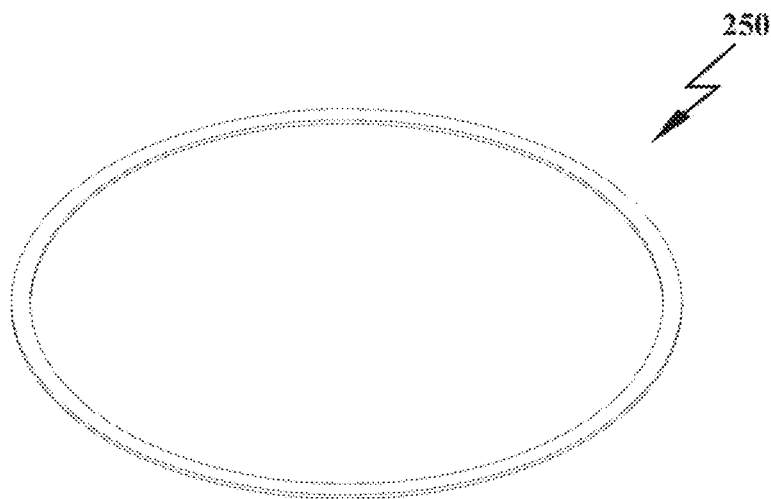
FIG. 17 shows a top perspective view of an embodiment of the slide ring.
Figure 18:
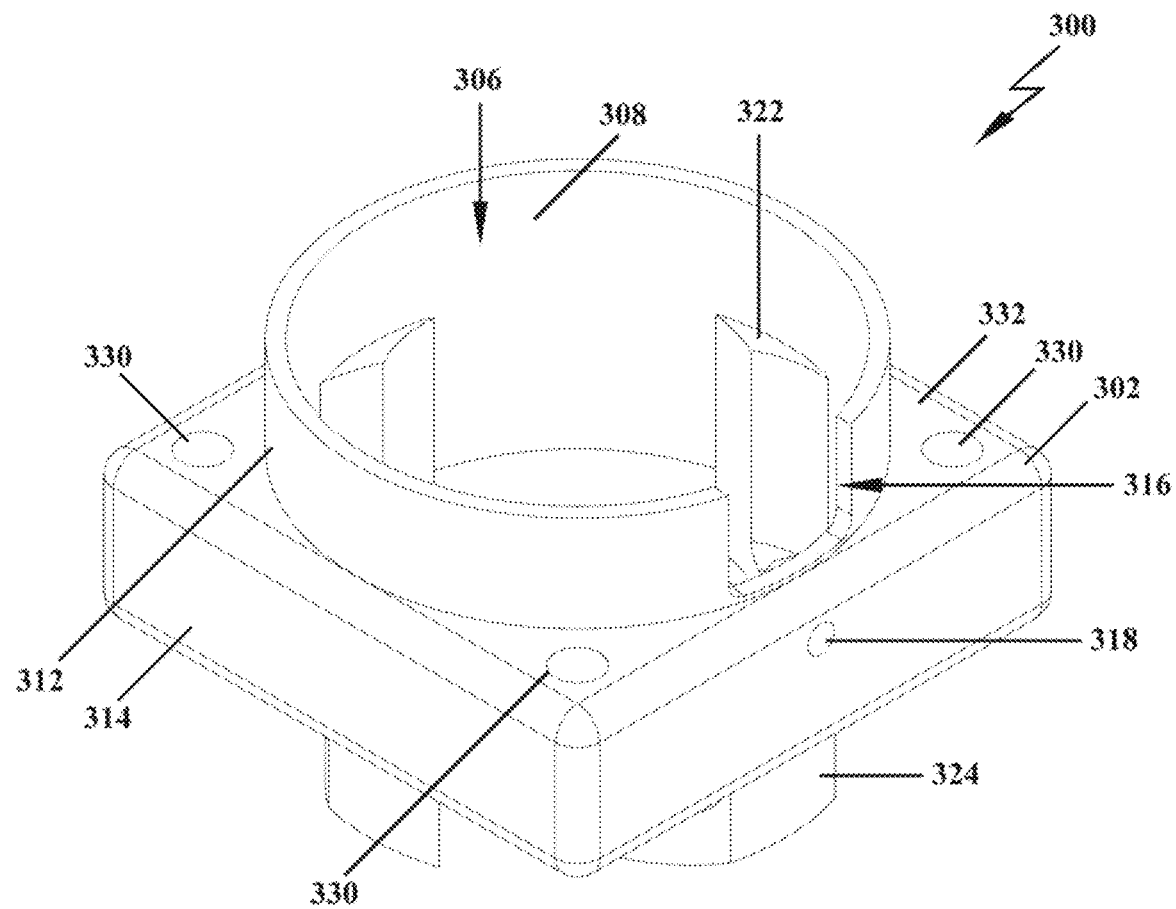
FIG. 18 shows a top perspective view of an embodiment of the third housing.
Figure 19:
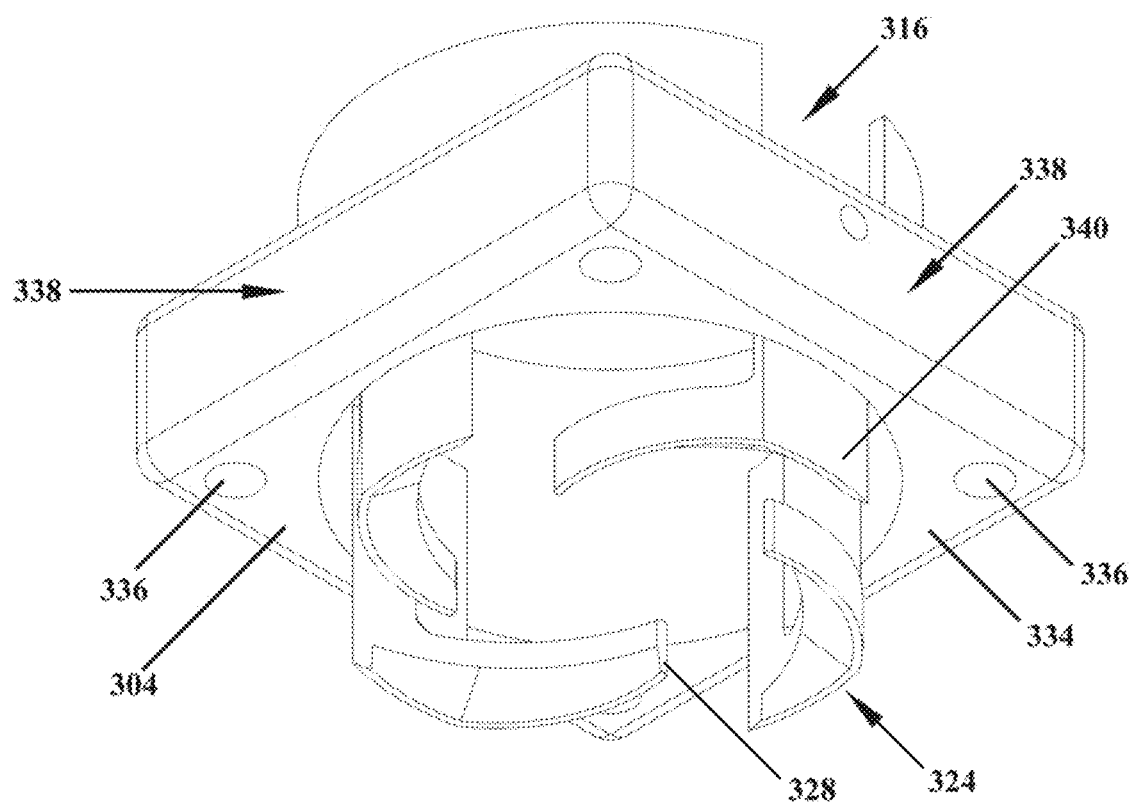
FIG. 19 shows a bottom perspective view of the third housing.
Figure 20:
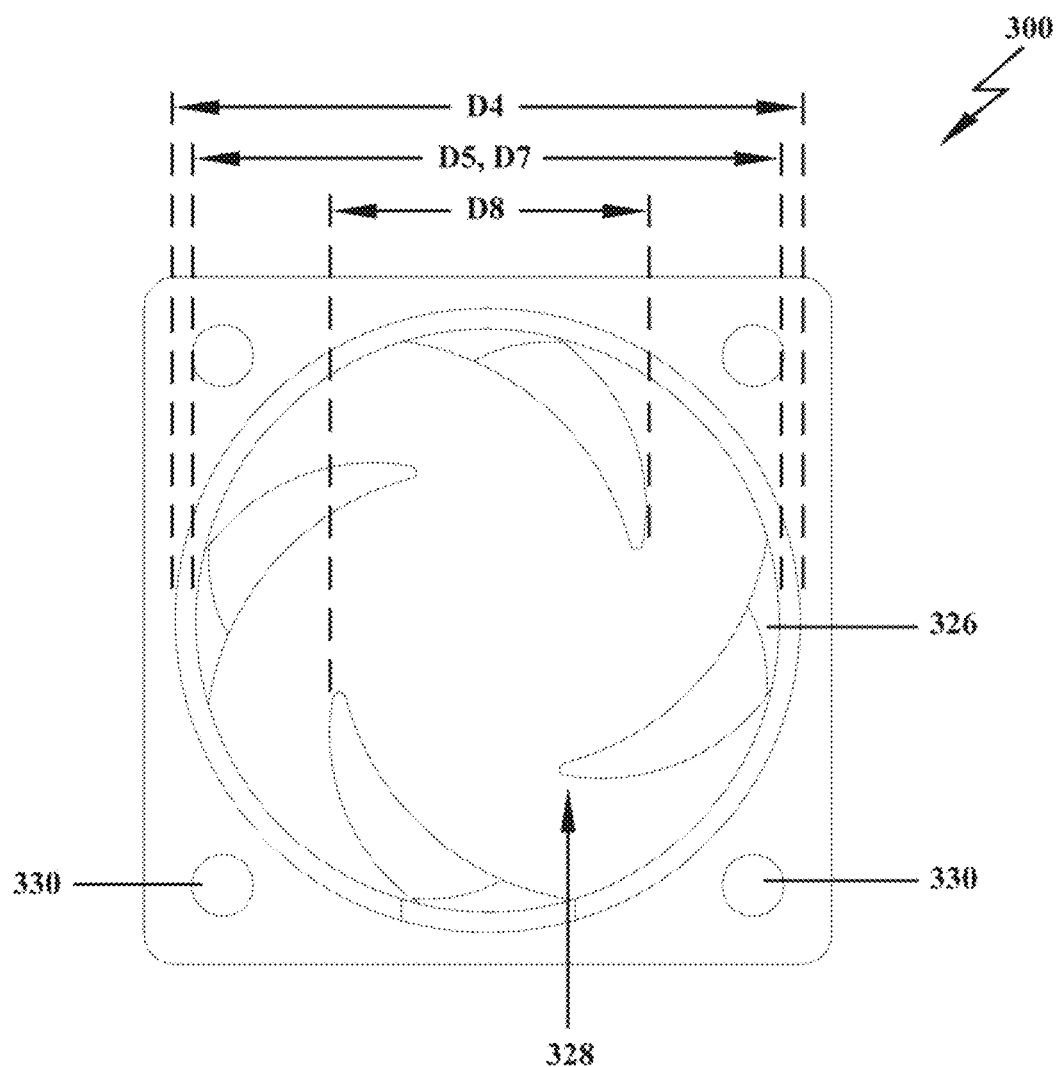
FIG. 20 shows a top view of the third housing.
Figure 21:
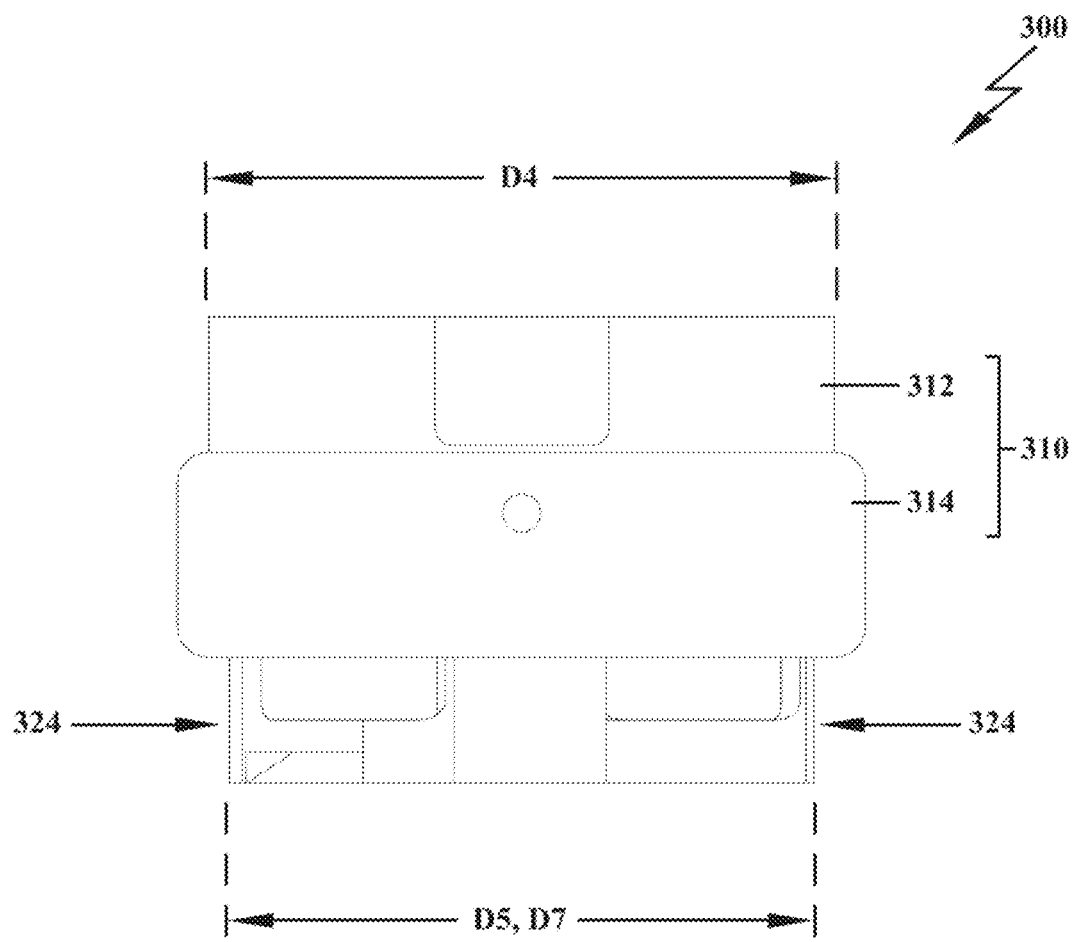
FIG. 21 shows a side view of the third housing.
Figure 22:
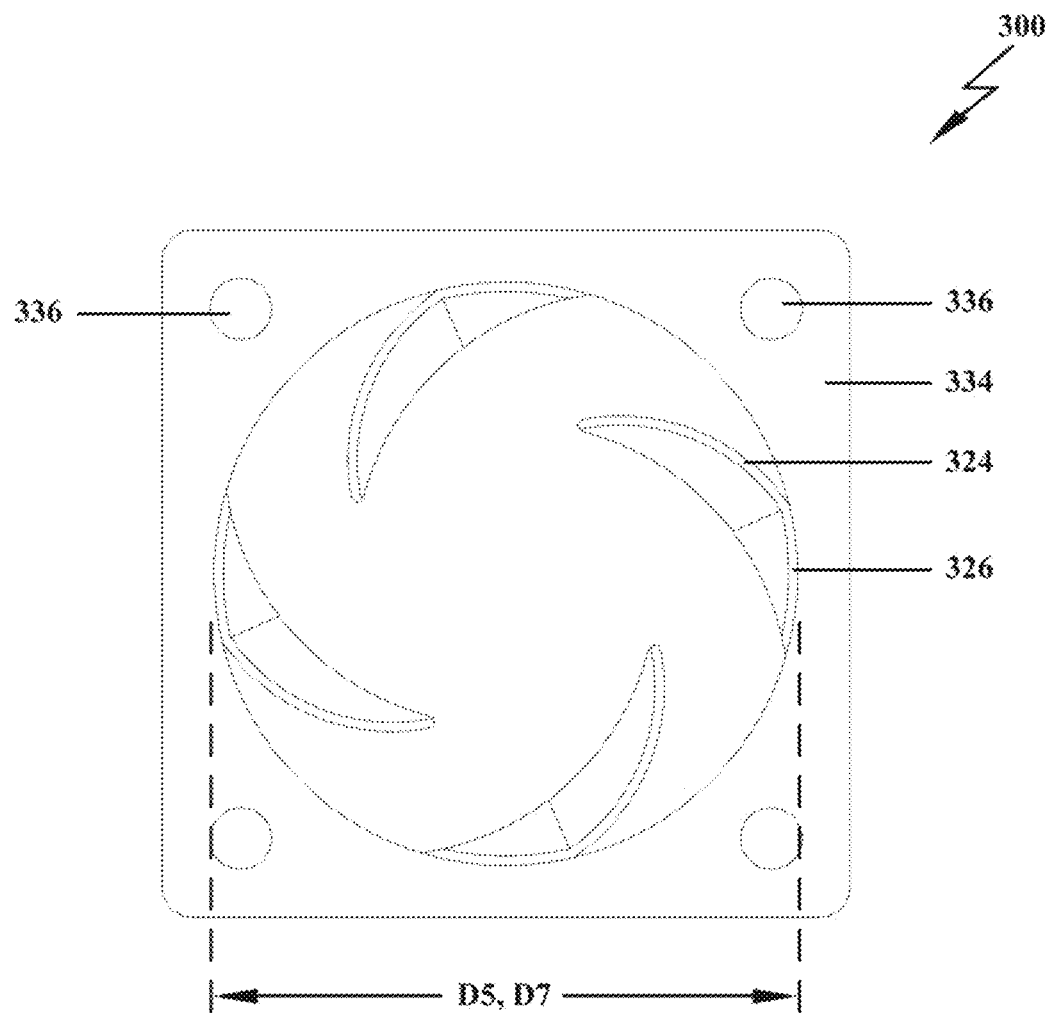
FIG. 22 shows a bottom view of the third housing.

With reference to FIG. 17, to facilitate rotation of the first housing 100 relative to the second housing 200, the system 50 may further comprise a slide ring 250 configured to be placed in between the first housing 100 and the second housing 200. In the preferred embodiment, the slide ring 250 is a circular ring configured to slide over the upper outer wall 210a of the second housing 200 adjacent to the upper compartment 206a, and rest on top of the base 202. When the first housing 100 is mounted on top of the second housing 200, the bottom surface 122 of the first housing sidewall 104 rests on top of the slide ring 250. The slide ring 250 reduces the friction that could have otherwise been created in between the first housing 100 and second housing 200 when the first housing 100 is rotated relative to the second housing 200.

With reference to FIGS. 18-22, a third housing 300 is configured to be positioned adjacent to the second housing 200 and opposite the first housing 100. Specifically, the second housing 200 is configured to be mounted on top of the third housing 300. The third housing 300 comprises a third housing sidewall 304 that defines a third compartment 306. The third housing sidewall 304 is defined by an inner wall 308 and an outer wall 310. The inner wall 308 is preferably cylindrical in shape to match the configuration of the second compartment 206.

The outer wall 310 can be identified as having an upper portion 312 and a lower portion 314. The upper portion 312 of the outer wall 310 can be cylindrical to tit inside the lower compartment 206b of the second housing 200. As such, the lower compartment 206b can have a diameter D3 that is substantially similar to the diameter D4 of the upper portion 312 of the outer wall 310 of the third housing 300. To provide a landing for the second housing 200, the lower portion 314 of the outer wall 310 can extend radially outwardly beyond the outer wall 310 at the upper portion 312. The shape of the outer wall 310 at the lower portion 314 can be any shape. Preferably, however, the outer wall 310 at the lower portion 314 is the same shape as the outer wall 210 of the second housing 200 adjacent to the lower compartment 206b. As such, in the preferred embodiment, the lower portion 314 of the outer wall 310 of the third housing 300 is square or box-shape.

The upper portion 312 of the third housing sidewall 304 further defines a lower sidewall opening 316. The lower sidewall opening 316 is configured to align with the upper sidewall opening 212 of the second housing 200. As such, when the upper sidewall opening 212 is aligned with the lower sidewall opening 316 partially processed material inside the third compartment 306 can be removed. Because the second housing 200 covers the upper portion 312 of the outer wall 310 of the third housing 300, a user may not be able to see where the lower sidewall opening is located 316. As such, an opening alignment marker 318 can be positioned adjacent to the lower sidewall opening 316. Therefore, if the user intends on aligning the upper sidewall opening 212 with the lower sidewall opening 316, the user simply aligns the upper sidewall opening 212 with the opening alignment marker 318 on the third housing 300. As such, the opening alignment marker 318 is preferably placed on the outer wall 310 at the lower portion 314 of the third housing sidewall 304 adjacent to the lower sidewall opening 316.

Figure 23:
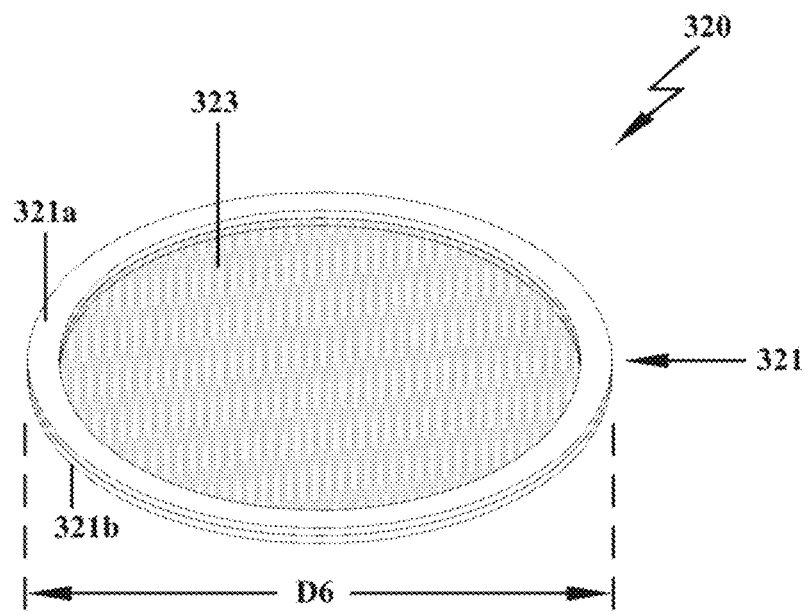
FIG. 23 shows a perspective view of the filter.

When the upper sidewall opening 212 and the lower sidewall opening 316 are not aligned, then the contents of the third compartment 306 remain inside the system 50. The third housing 300 can comprise a filter 320 (see FIG. 23), mounted inside the third compartment 306 below the lower sidewall opening 316. As such, the filter 320 can be mounted on the inner wall 308 of the third housing sidewall 304. The filter 320 can be fixedly attached inside the third compartment 306 or removably attached inside the third compartment 306.

Preferably, the inner wall 308 of the third housing sidewall 304 can have one or more projections 322 protruding radially inwardly around the perimeter of the inner wall 308. As such, the inner wall 308 can have a diameter D5. The filter 320 can be a ring shaped filter having a diameter D6, wherein the diameter D6 of the filter 320 is substantially similar to the diameter D5 of the inner wall 308 of the third housing sidewall 304. With projections 322 protruding radially inward, the filter 320 can be mounted on top of the projections 322 to prevent the filter 320 from falling through. The filter 320 can comprise a support ring 321 with a screen 323 attached thereto. In the preferred embodiment, the supporting ring 321 is a double ring with one support ring 321a stacked on top of a second support ring 321b with the screen 323 sandwiched therebetween. The screen 323 can be a mesh screen having a plurality of fine holes to allow granulated organic material to pass through while preventing cut up and shredded pieces to remain above the filter 320.

The third housing 300 can further comprise a plurality of dispensing fins 324 located below the filter 320 and projecting downwardly from the third housing sidewall 304 away from the filter 320. Each fin 324 comprises a base end 326 operatively connected to the third housing sidewall 304, and a free end 328, wherein the free ends 328 of each dispensing fin 324 is radially closer to the longitudinal axis L than the respective base ends 326 of each dispensing fin 324. As such, the dispensing fins 324 encircle the longitudinal axis L in a spiraling pattern. Therefore, the diameter D7 as measured from diametrically opposite base ends 326 is greater than the dimeter D8 of an imaginary circle defined by the free ends 328 of the dispensing fins 324. Rotation of the dispensing fins 324 facilitates removal of the granules from the device as discussed further below.

In the preferred embodiment, the dispensing fins 324 are operatively connected to the inner wall 308 of the third housing sidewall 304. As such, a portion of the base end 326 of the dispensing fin 324 can function as the projection 322 upon which the filter 320 can be mounted. In the embodiment in which the lower portion of the third housing 300 is box-shaped, the base ends 326 of each fin 324 can be placed approximately centrally located on each side. Thus, the base ends 326 create a downward extension 340 of the inner wall 308 adjacent to the central portions of each side.

To facilitate assembly of the third housing 300 to the second housing 200, the third housing 300 can have a plurality of third housing upper magnets 330. The third housing upper magnets 330 are configured to mate with the plurality of second housing magnets 220. In the preferred embodiment, the second housing sidewall 204 defining the lower compartment 206b is box-shaped. The lower portion 314 of the third housing sidewall 304 is similarly box-shaped having a top surface 332, a bottom surface 334, and the lower portion outer sidewall 314 therebetween. As such, the plurality of third housing upper magnets 330 can be positioned on the top surface 332 of the lower portion of the outer sidewall 314, preferably at the corners.

The third housing 300 is also configured to mount on top of the fourth housing 400. To facilitate attachment of the third housing 300 to the fourth housing 400, the third housing 300 can further comprise a plurality of third housing lower magnets 336. Preferably, the third housing lower magnets 336 are positioned on the bottom surface 334 at the corners, opposite the third housing upper magnets 330.

Figure 24:
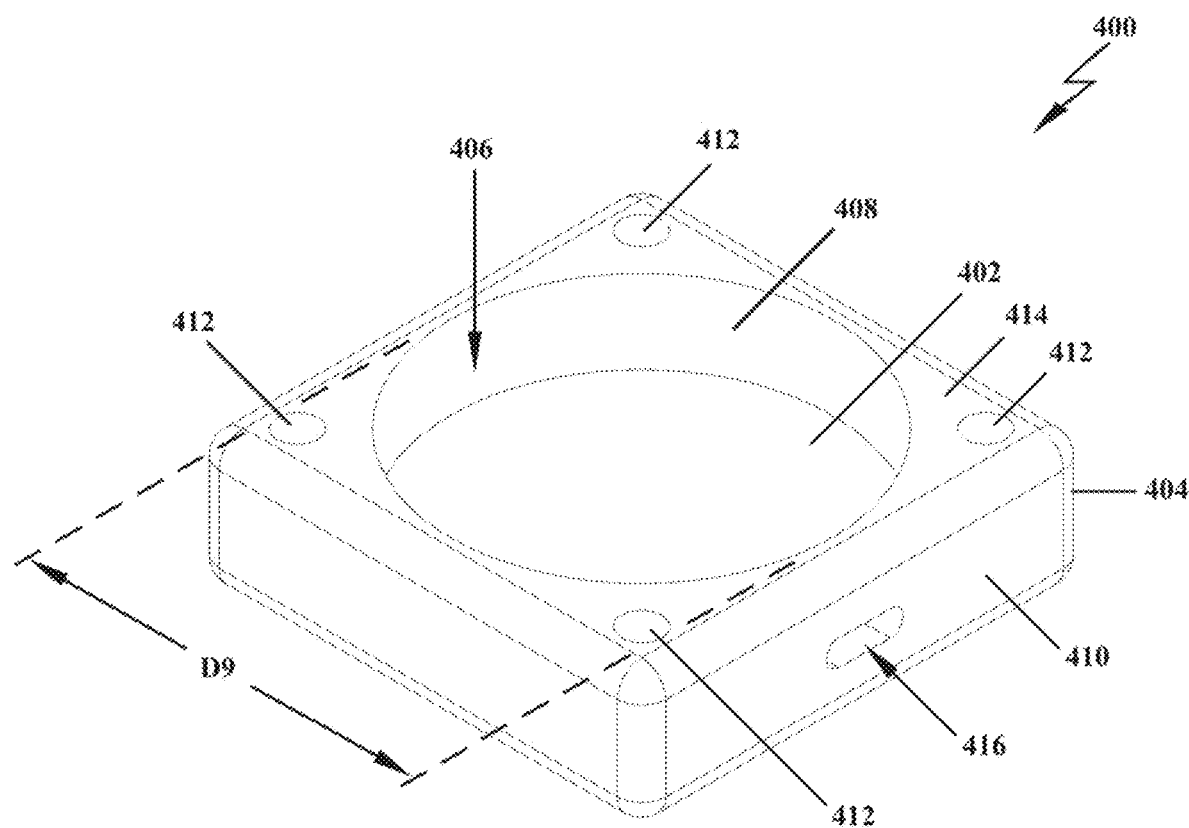
FIG. 24 shows a perspective view of the fourth housing.

With reference to FIG. 24, the fourth housing 400 is configured to be positioned adjacent to the third housing 300 and opposite the second housing 200. The fourth housing comprising a floor 402 and a fourth housing sidewall 404 defining a fourth compartment 406. Preferably, the fourth compartment 406 is cylindrical and configured to receive the dispensing fins 324 of the third housing 300. As such, the fourth housing sidewall 404 has an inner wall 408 that is cylindrical in shape having a diameter D9 that is substantially similar to the diameter D7 defined by the base ends 326 of the dispensing fins so that that dispensing fins 326 can fit inside the fourth compartment 406. The outer wall 410 of the fourth housing sidewall 404 can be any shape, but is preferably, rectangular, and specifically square.

To facilitate connection to the third housing 300, the fourth housing 400 comprises a plurality of fourth housing magnets 412 configured to mate with the plurality of third housing lower magnets 336. As such, the fourth housing magnets 412 can be placed on a top surface 414 of the fourth housing sidewall 404, preferably at the corners.

The fourth housing sidewall 404 can define a slot 416. Preferably, in a box-shaped fourth housing 400, the slot 416 is centrally located on one of the sides of the box. The slot 416 defines an opening from the outer wall 410 through the inner wall 408. When the third housing 300 is connected to the fourth housing 400 with the third housing lower magnets 336 attached to the fourth housing magnets 412, the extension 340 of one of the base end 326 of one of the dispensing fins 324 blocks the slot 416. The grinding process accumulates granules in the fourth compartment 406. When the system 50 is tilted to have the slot 416 facing towards the ground, the granules accumulate near the slot 416. As the third housing 300 is rotated relative to the fourth housing 400 in a manner that the free end 328 of an adjacent dispensing fin 324 move towards the slot 416, the slot 416 is opened because the free end 328 is positioned radially inward. As the rotation continues, the base end 326 of the adjacent dispensing fin 324 moves towards the opening. Because the base end 326 is connected to the inner wall 308 of the third housing 300, which has a diameter D5 that is substantially the same as the diameter D9 of the fourth compartment, a wedge is created between the approaching dispensing fin 324 and the inner wall 408 of the fourth housing 400. The continued rotation of the third housing 300 relative to the fourth housing 400 causes the granules to accumulate in the wedge. As the wedge moves closer to the slot 416, the granules are pushed out of the fourth compartment 406 through the slot 416. When the third housing lower magnets 336 re-connect to the fourth housing magnets 412, the extension 340 of the base end 326 of what was the adjacent dispensing fins 324 before the rotation began now blocks the slot 416.

In use, user places the fourth housing 400 on a surface, then mounts the third housing 300 on top of the fourth housing 400. The filter 320 is placed inside the third compartment 306 of the third housing 300. The second housing 200 is mounted on the third housing 300. Unground organic material can be placed on the lower grinding teeth 214 of the second housing 200. The user then places first housing 100 on top of second housing 200, sandwiching the organic material within the two compartments 106, 206 defined by the first and second housings 100, 200. The user then rotates the first housing 100 relative to the second housing 200, preferably while applying downward pressure, allowing the upper grinding teeth 114 and the lower grinding teeth 214 to process the organic material by cutting, crushing, mincing, shredding, and/or grinding the organic material into finer clumps and granules, causing the organic material to fall through the drop-through holes 216 of the second housing 200 and drop-through holes 240 of the lower plate 230, into the third compartment 306 of the third housing 300, and onto the filter 320 in the third compartment 306.

When processing is complete, the user may remove the first housing 100 from the second housing 200 for cleaning purposes using the upper plate 130 and the lower plate 230. With the first housing 100 inverted, the user pushes the upper plate button 136 to release the reciprocal upper plate magnets 142 from the upper plate magnets 118 of the first housing 100. Pressing on the upper plate button 136 causes the upper plate 130 to slide along each upper grinding tooth 114 via the upper grinding teeth holes 138, forcing any organic material stuck in the upper grinding teeth 114 to be pushed free. The user can do the same for the lower plate 230, pushing the lower plate button 236 to free any stuck material in the lower grinding teeth 214 as the lower plate slides along each lower grinding tooth 214 via the lower grinding teeth holes 238. Once the organic material is removed from the upper grinding teeth 114 and lower grinding teeth 214, the upper plate 130 and lower plate 230 can be re-attached to their respective housings 100, 200 via their respective magnetic connections. When the first housing 100 is mounted back on top of the second housing 200, the additionally loosened organic material can fall through the drop-through holes into the third compartment 306, or the processing can be repeated.

For a thorough cleaning, the upper plate 130 and lower plate 230 can be completely removed from their respective housings 100, 200. Once cleaned, the upper plate 130 can be reinserted into the first housing 100 by aligning the first housing alignment marker 120 on the first housing 100 with the upper plate alignment marker 140 of the upper plate 130. Similarly, the lower plate 230 can be properly installed back into the second housing 200 by aligning the second housing alignment marker 224 with the lower plate alignment marker 252.

When the processed material enters the third compartment 306, finely ground material fall through the filter 320 into the fourth compartment, while partially processed material remain caught on the filter 320. With the filter 320 now full of partially processed organic material, the user rotates the second housing 200 (and optionally the first housing 100) relative to the third housing 300 until the upper sidewall opening 212 of the second housing is aligned with the lower sidewall opening 316 of the third housing 300. This can be accomplished by aligning the upper sidewall opening 212 with the opening alignment marker 318 on the third housing 300. This creates an opening to the third compartment 306 allowing the user to pour the material from within the third compartment 306 into a preferred consumption device or storage location (a container, pipe, bong, rolling paper, etc.) without needing to touch the material directly with the user's fingers or spilling and fumbling the material as is the result of traditional grinders.

The user then closes the sidewall openings by again rotating the second housing 200 relative to the third housing 300 until the openings are no longer aligned. The corner magnets 220, 330 allow for quarter turns to snap into place upon rotation.

The user then angles the assembled system 50 such that the slot 416 of the fourth housing 400 is facing downwardly, above the preferred consumption location, in preparation of distributing the granular material. The user then rotates the third housing 300 in relation to the fourth housing 400 in order to rotate the dispensing fins 324 of the third housing 300 within the fourth compartment 406. This quarter rotation movement of the third housing 300 relative to the fourth housing 400 allows the dispensing fins 324 to temporarily open the slot 416, push a controlled amount of granular material through the slot 416, and then close the slot 416 again when the next dispensing fin 324 rotates into place.

These quarter turns allow the user to distribute the organic granular material in a controlled fashion when desired, as well as store the material safely without completely exposing the fourth compartment 406 to the external environment, for example, by removing the third compartment 300. This process eliminates the need for the user to directly touch the granular material or fumble with the small plastic shovel shapes that come with traditional grinders. Although the preferred embodiment is to rotate the housings relative to each other to process the material, other motions can accomplish the same objective with the grinding teeth properly arranged, such as a side-to-side motion or an up-and-down motion of the housings relative to each other.

The components are preferably made with aluminum parts, and manufactured with CNC machines and then anodized to have a selection of finish colors (possibly gold, rose gold, grey and black). Other manufacturing techniques can be used including the use of a mold.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A system for processing organic material, the system defining a longitudinal axis when assembled, and comprising:
   a) a first housing comprising:
      i) a ceiling;
      ii) a first housing sidewall projecting perpendicularly from the ceiling, the ceiling and the first housing sidewall defining a first compartment, wherein the first compartment is cylindrical,
      iii) an upper button hole defined centrally on the ceiling about the longitudinal axis when assembled,
      iv) a plurality of upper grinding teeth, projecting perpendicularly from the ceiling within the first compartment and surrounding the button hole, wherein the plurality of upper grinding teeth are arranged in sets of concentrically arranged rings,
      v) a plurality of upper plate magnets on the ceiling of the first housing, and
      vi) a first housing alignment marker on the first housing sidewall,
   b) an upper plate defining a top side and a bottom side opposite the top side, the upper plate configured to be housed inside the first compartment, the upper plate comprising:
      (i) an upper plate button centrally located on the upper plate and projecting perpendicularly from the top side of the upper plate, the upper plate button configured to be inserted into the upper button hole of the first housing,
      ii) a plurality of upper grinding teeth holes, the plurality of upper grinding teeth holes configured to receive the plurality of upper grinding teeth,
      iii) a plurality of reciprocal upper plate magnets on the top side of the upper plate, wherein the plurality of reciprocal upper plate magnets correspond with the upper plate magnets when the upper plate button is inserted into the button hole and the plurality of upper grinding teeth are inserted into the plurality of upper grinding teeth holes, and
      iv) an upper plate center magnet centrally located on the upper plate and projecting perpendicularly from the bottom side of the upper plate opposite the upper plate button and in line with the longitudinal axis;
   c) a second housing configured to be positioned adjacent to the first housing, the second housing comprising:
      i) a second housing sidewall defining a second compartment, wherein the second compartment is cylindrical,
      ii) a base dividing the second compartment into an upper compartment and a lower compartment, wherein an outer wall of the second housing sidewall corresponding with the upper compartment is cylindrical and configured to fit inside the first compartment,
      iii) a plurality of lower grinding teeth projecting into the upper compartment from the base, wherein the plurality of lower grinding teeth are arranged in sets of concentrically arranged rings, wherein the plurality of lower grinding teeth are configured to pass by the plurality of upper grinding teeth when the first housing is rotated relative to the second housing,
      iv) a plurality of drop-through holes defined within the base and interspersed in between the plurality of lower grinding teeth,
      v) a lower button hole defined within the base centrally located and aligned with the longitudinal axis,
      vi) a plurality of lower plate magnets on a top side of the base,
      vii) an upper sidewall opening defined in a portion of the second housing sidewall adjacent to the lower compartment,
      viii) a second housing alignment marker on the second housing sidewall,
      ix) a plurality of second housing magnets on a bottom surface of the second housing sidewall adjacent to the lower compartment;
   d) a lower plate configured to fit inside the upper compartment of the second housing, the lower plate comprising:
      i) a lower plate button configured to fit inside the lower button hole,
      ii) lower grinding teeth holes configured to receive the plurality of lower grinding teeth, and
      iii) a lower plate center magnet configured to mate with the upper plate center magnet,
   e) a slide ring configured to be positioned in between the first housing and the second housing when the second housing is positioned adjacent to the first housing;
   f) a third housing defining a third compartment, the third housing configured to be positioned adjacent to the second housing and opposite the first housing, the third housing comprising:
      i) a third housing sidewall defining a third compartment, wherein the third compartment is cylindrical and configured to fit inside the lower compartment of the second housing, ii) a filter mounted on the third housing sidewall inside the third compartment, iii) a lower sidewall opening defined in the third housing sidewall, iv) an opening alignment marker on the third housing sidewall adjacent to the lower sidewall opening, v) a plurality of third housing upper magnets configured to mate with the plurality of second housing magnets, vi) a plurality of third housing lower magnets, and vii) a plurality of dispensing fins projecting from the third housing sidewall away from the filter, the plurality of fins encircling the longitudinal axis, wherein each fin comprises a base end operatively connected to the third housing sidewall and a free end, wherein the free ends of each dispensing fin is radially closer to the longitudinal axis than the respective base end of each dispensing fin; and g) a fourth housing configured to be positioned adjacent to the third housing and opposite the second housing, the fourth housing comprising:

i) a fourth housing sidewall defining a fourth compartment, wherein the fourth compartment is cylindrical and configured to receive the dispensing fins of the third housing, ii) a slot defined in the fourth housing sidewall, and iii) a plurality of fourth housing magnets configured to mate with the plurality of third housing lower magnets.

2. A system for processing organic material, comprising:

a) a first housing comprising:

i) a ceiling, ii) a first housing sidewall, the ceiling and the first housing sidewall defining a first compartment, and iii) a plurality of upper grinding teeth, projecting from the ceiling within the first compartment;

b) an upper plate defining a top side and a bottom side opposite the top side, the upper plate configured to be housed inside the first compartment, the upper plate comprising a plurality of upper grinding teeth holes, the plurality of upper grinding teeth holes configured to receive the plurality of upper grinding teeth;

c) a second housing configured to be positioned adjacent to the first housing, the second housing comprising:

i) a second housing sidewall defining a second compartment, ii) a base dividing the second compartment into an upper compartment and a lower compartment, iii) a plurality of lower grinding teeth projecting into the upper compartment from the base, and iv) a plurality of drop-through holes defined within the base and interspersed in between the plurality of lower grinding teeth;

d) a lower plate configured to fit inside the upper compartment of the second housing, the lower plate comprising lower grinding teeth holes configured to receive the plurality of lower grinding teeth;

e) a third housing defining a third compartment, the third housing configured to be positioned adjacent to the second housing and opposite the first housing, the third housing comprising:

i) a third housing sidewall defining a third compartment, and ii) a filter mounted on the third housing sidewall inside the third compartment; and f) a fourth housing configured to be positioned adjacent to the third housing and opposite the second housing, the fourth housing comprising a fourth housing sidewall and a floor defining a fourth compartment, wherein the first housing, second housing, third housing, and fourth housing are stackable to define a longitudinal axis.

3. The system of claim 2, wherein the first housing defines an upper button hole centrally located on the ceiling, wherein the upper plate comprises an upper plate button centrally located on the upper plate and projecting from the top side of the upper plate, and wherein the upper plate button is configured to be inserted into the upper button hole of the first housing.

4. The system of claim 2, wherein the second housing comprises a lower button hole defined within the base and centrally located on the base, and wherein the lower plate comprises a lower plate button configured to fit inside the lower button hole when the lower plate is mounted in the second housing.

5. The system of claim 2, wherein the plurality of upper grinding teeth are arranged in a first set of concentrically arranged rings defining a circular gap in between each concentrically arranged ring, wherein the plurality of lower grinding teeth are arranged in a second set of concentrically arranged rings, and wherein each lower grinding teeth ring is configured to reside in one of the gaps defined by the first set of concentrically arranged rings defined by the plurality of upper grinding teeth.

6. The system of claim 2, wherein the second housing comprises an upper sidewall opening adjacent to the lower compartment, and the third housing comprises a lower sidewall opening, wherein the upper sidewall opening and lower sidewall opening are configured to align.

7. The system of claim 2, wherein the third housing comprises a plurality of dispensing fins projecting from the third housing sidewall away from the filter, the plurality of fins encircling the longitudinal axis, wherein each fin comprises a base end operatively connected to the third housing sidewall and a free end, wherein the free ends of each dispensing fin is radially closer to the longitudinal axis than the respective base end of each dispensing fin when the first housing, the second housing, the third housing, and the fourth housing are stacked to define the longitudinal axis.

8. The system of claim 7, wherein the fourth housing sidewall defines a slot.

9. The system of claim 7, wherein the first compartment is cylindrical and an outer wall portion of the second housing sidewall corresponding with the upper compartment is cylindrical and configured to fit inside the first compartment, wherein the second compartment is cylindrical and an outer wall portion of the third compartment is configured to fit inside the lower compartment of the second housing, wherein the third compartment is cylindrical, and wherein the fourth compartment is cylindrical and configured to receive the dispensing fins of the third housing.

10. The system of claim 2, wherein the first housing comprises a plurality of upper plate magnets on the ceiling of the first housing, and wherein the upper plate comprises a plurality of reciprocal upper plate magnets on the top side, wherein the plurality of reciprocal upper plate magnets are configured to correspond with the upper plate magnets when the upper plate is mounted in the first compartment.

11. The system of claim 2, wherein the second housing comprises a plurality of lower plate magnets on a top side of the base, and the lower plate comprises a plurality of reciprocal lower plate magnets on a bottom side of the lower plate, wherein the plurality of reciprocal lower plate magnets are configured to correspond with the lower plate magnets when the lower plate is mounted in the second compartment.

12. The system of claim 2, wherein the second housing comprises a plurality of second housing magnets on the second housing sidewall adjacent to the lower compartment, and the third housing comprise a plurality of third housing upper magnets configured to mate with the plurality of second housing magnets when the second housing is mounted on the third housing.

13. The system of claim 2, wherein the third housing comprises a plurality of third housing lower magnets, and the fourth housing comprises a plurality of fourth housing magnets configured to mate with the plurality of third housing lower magnets when the third housing is mounted on the fourth housing.

14. The system of claim 2, wherein the upper plate comprises an upper plate center magnet centrally located on the upper plate and projecting perpendicularly from the bottom side of the upper plate, and wherein the lower plate comprises a lower plate center magnet configured to mate with the upper plate center magnet when the second housing is mounted on the third housing.

15. The system of claim 2, further comprising a first housing alignment marker on the first housing sidewall, a second housing alignment marker on the second housing sidewall, and an opening alignment marker on the third housing sidewall adjacent to a lower sidewall opening on the third housing.

16. The system of claim 2, further comprising a slide ring configured to be positioned in between the first housing and the second housing when the second housing is positioned adjacent to the first housing.

17. A system for processing organic material, comprising:
a) a first housing comprising:
  i) a ceiling,
  ii) a first housing sidewall, the ceiling and the first housing sidewall defining a first compartment, and
  iii) a plurality of upper grinding teeth, projecting from the ceiling within the first compartment;
b) an upper plate defining a top side and a bottom side opposite the top side, the upper plate configured to be housed inside the first compartment, the upper plate comprising a plurality of upper grinding teeth holes, the plurality of upper grinding teeth holes configured to receive the plurality of upper grinding teeth;
c) a second housing configured to be positioned adjacent to the first housing, the second housing comprising:
  i) a second housing sidewall defining a second compartment,
  ii) a base dividing the second compartment into an upper compartment and a lower compartment,
  iii) a plurality of lower grinding teeth projecting into the upper compartment from the base, and
  iv) a plurality of drop-through holes defined within the base and interspersed in between the plurality of lower grinding teeth;
d) a lower plate configured to fit inside the upper compartment of the second housing, the lower plate comprising lower grinding teeth holes configured to receive the plurality of lower grinding teeth;
e) a third housing defining a third compartment, the third housing configured to be positioned adjacent to the second housing and opposite the first housing, the third housing comprising:
  i) a third housing sidewall defining a third compartment, and
  ii) a filter mounted on the third housing sidewall inside the third compartment; and
f) a fourth housing configured to be positioned adjacent to the third housing and opposite the second housing, the fourth housing comprising a fourth housing sidewall and a floor defining a fourth compartment, wherein the first housing, second housing, third housing, and fourth housing are stackable to define a longitudinal axis
g) wherein the first housing defines an upper button hole centrally located on the ceiling, wherein the upper plate comprises an upper plate button centrally located on the upper plate and projecting from the top side of the upper plate, and wherein the upper plate button is configured to be inserted into the upper button hole of the first housing; and
h) wherein the second housing comprises a lower button hole defined within the base and centrally located on the base, and wherein the lower plate comprises a lower plate button configured to fit inside the lower button hole when the lower plate is mounted in the second housing.

18. The system of claim 17, wherein the plurality of upper grinding teeth are arranged in a first set of concentrically arranged rings defining a circular gap in between each concentrically arranged ring, wherein the plurality of lower grinding teeth are arranged in a second set of concentrically arranged rings, and wherein each lower grinding teeth ring is configured to reside in one of the gaps defined by the first set of concentrically arranged rings defined by the plurality of upper grinding teeth.

19. The system of claim 18, wherein the second housing comprises an upper sidewall opening adjacent to the lower compartment, and the third housing comprises a lower sidewall opening, wherein the upper sidewall opening and lower sidewall opening are configured to align.

20. The system of claim 19, wherein the third housing comprises a plurality of dispensing fins projecting from the third housing sidewall away from the filter, the plurality of fins encircling the longitudinal axis when the first housing, the second housing, the third housing, and the fourth housing are stacked to define the longitudinal axis, wherein each dispensing fin comprises a base end operatively connected to the third housing sidewall and a free end, wherein the free ends of each dispensing fin spiral inwardly, and wherein the fourth housing sidewall defines a slot configured to be blocked by each base end of each dispensing fin when each base fin is adjacent to the slot.

* * * * *